United States Patent
Kenthapadi et al.

(10) Patent No.: US 10,607,189 B2
(45) Date of Patent: Mar. 31, 2020

(54) RANKING JOB OFFERINGS BASED ON GROWTH POTENTIAL WITHIN A COMPANY

(71) Applicant: Microsoft Technology Licensing, LLC, Redmond, WA (US)

(72) Inventors: Krishnaram Kenthapadi, Sunnyvale, CA (US); Kaushik Rangadurai, Sunnyvale, CA (US); Bo Zhao, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 122 days.

(21) Appl. No.: 15/478,821

(22) Filed: Apr. 4, 2017

(65) Prior Publication Data
US 2018/0285823 A1    Oct. 4, 2018

(51) Int. Cl.
| | |
|---|---|
| G06Q 10/10 | (2012.01) |
| G06Q 50/00 | (2012.01) |
| G06F 7/08 | (2006.01) |
| G06N 20/00 | (2019.01) |
| G06N 5/02 | (2006.01) |

(52) U.S. Cl.
CPC ........... *G06Q 10/1053* (2013.01); *G06F 7/08* (2013.01); *G06N 20/00* (2019.01); *G06Q 50/01* (2013.01); *G06N 5/022* (2013.01)

(58) Field of Classification Search
USPC ........................................................ 705/321
See application file for complete search history.

(56) References Cited

U.S. PATENT DOCUMENTS

| | | |
|---|---|---|
| 7,185,065 B1 | 2/2007 | Holtzman et al. |
| 7,818,396 B2 | 10/2010 | Dolin et al. |
| 8,713,000 B1 * | 4/2014 | Elman ................... G06Q 30/08 707/722 |
| 8,849,813 B1 | 9/2014 | Iyer et al. |
| 8,914,383 B1 | 12/2014 | Weinstein et al. |

(Continued)

OTHER PUBLICATIONS

"2012-2013 Student Internship/Co-op and Full-Time Outcome Report", Retrieved from: https://cdn.uconnectlabs.com/wp-content/uploads/sites/15/2016/05/StudentOutcomes20122013Final.pdf, 2013, 11 Pages.

(Continued)

*Primary Examiner* — Andrew B Whitaker
(74) *Attorney, Agent, or Firm* — Schwegman Lundberg & Woessner, P.A.

(57) ABSTRACT

Methods, systems, and computer programs are presented for ranking and presenting companies that are experiencing high growth in positions fulfillable by a user in response to a search for the user. A method includes identifying, on a social network, jobs that are available for presentation to the user and offered by one or more companies. The method further includes identifying proxy users who have similar skills as the user. For each company, a server determines a position growth score based on the number of proxy users who have transitioned to or from the company within a predetermined amount of time. The server additionally ranks the jobs within a high-growth companies group for the user based on the position growth score for each job. The jobs are then presented to the user on a user interface according to the job ranking.

14 Claims, 18 Drawing Sheets

(56) References Cited

U.S. PATENT DOCUMENTS

| | | |
|---|---|---|
| 9,536,226 B2 | 1/2017 | Elman et al. |
| 2003/0220811 A1 | 11/2003 | Fan et al. |
| 2004/0143469 A1 | 7/2004 | Lutz et al. |
| 2004/0219493 A1 | 11/2004 | Phillips |
| 2004/0243560 A1 | 12/2004 | Broder et al. |
| 2006/0004869 A1 | 1/2006 | Yuster et al. |
| 2006/0042483 A1 | 3/2006 | Work et al. |
| 2006/0229896 A1 | 10/2006 | Rosen et al. |
| 2006/0265258 A1 | 11/2006 | Powell et al. |
| 2007/0288308 A1 | 12/2007 | Chen et al. |
| 2008/0243637 A1 | 10/2008 | Chan et al. |
| 2010/0057659 A1 | 3/2010 | Phelon et al. |
| 2010/0324970 A1 | 12/2010 | Phelon et al. |
| 2010/0332405 A1 | 12/2010 | Williams |
| 2011/0184958 A1 | 7/2011 | Krishnamoorthy et al. |
| 2011/0238591 A1 | 9/2011 | Kerr et al. |
| 2012/0197863 A1 | 8/2012 | Skomoroch et al. |
| 2013/0013526 A1 | 1/2013 | Le viet et al. |
| 2013/0110593 A1 | 5/2013 | Fowler |
| 2013/0124474 A1 | 5/2013 | Anderson |
| 2013/0138588 A1 | 5/2013 | Mehta et al. |
| 2013/0166358 A1 | 6/2013 | Parmar et al. |
| 2013/0198099 A1 | 8/2013 | Hyder et al. |
| 2013/0290205 A1 | 10/2013 | Bonmassar et al. |
| 2013/0297373 A1 | 11/2013 | Proux |
| 2014/0025748 A1 | 1/2014 | Mallet et al. |
| 2014/0122355 A1 | 5/2014 | Hardtke et al. |
| 2014/0129460 A1 | 5/2014 | Budzienski et al. |
| 2014/0136434 A1 | 5/2014 | Posse et al. |
| 2014/0143165 A1 | 5/2014 | Posse et al. |
| 2014/0164994 A1 | 6/2014 | Myslinski |
| 2014/0188681 A1 | 7/2014 | Shahghasemi |
| 2014/0214943 A1 | 7/2014 | Shapero et al. |
| 2014/0214945 A1 | 7/2014 | Zhang et al. |
| 2014/0237046 A1 | 8/2014 | Brooks et al. |
| 2014/0244335 A1 | 8/2014 | Baldwin et al. |
| 2014/0244520 A1 | 8/2014 | Wurtele et al. |
| 2014/0244530 A1 | 8/2014 | Baldwin et al. |
| 2014/0244531 A1 | 8/2014 | Baldwin et al. |
| 2014/0258288 A1 | 9/2014 | Work et al. |
| 2014/0279629 A1 | 9/2014 | Mcconnell |
| 2015/0006422 A1 | 1/2015 | Carter et al. |
| 2015/0019640 A1 | 1/2015 | Li et al. |
| 2015/0046353 A1 | 2/2015 | Elman et al. |
| 2015/0046356 A1 | 2/2015 | Millmore et al. |
| 2015/0120717 A1 | 4/2015 | Kim et al. |
| 2015/0127400 A1 | 5/2015 | Chan et al. |
| 2015/0127565 A1 | 5/2015 | Chevalier et al. |
| 2015/0220880 A1 | 8/2015 | Maipady et al. |
| 2015/0248648 A1 | 9/2015 | Rao |
| 2015/0278960 A1 | 10/2015 | Moore et al. |
| 2015/0287051 A1* | 10/2015 | Baig ............... G06Q 30/0201 705/7.29 |
| 2015/0317753 A1* | 11/2015 | Goel ............... H04L 67/30 705/319 |
| 2015/0317759 A1 | 11/2015 | Jing et al. |
| 2015/0317760 A1 | 11/2015 | Pham |
| 2015/0339938 A1 | 11/2015 | Sampath |
| 2015/0347606 A1 | 12/2015 | Goel et al. |
| 2015/0370798 A1 | 12/2015 | Ju et al. |
| 2016/0034853 A1 | 2/2016 | Wang et al. |
| 2016/0098683 A1 | 4/2016 | Angulo et al. |
| 2016/0267522 A1 | 9/2016 | Schellenberger et al. |
| 2016/0292643 A1 | 10/2016 | Rodriguez et al. |
| 2016/0314200 A1 | 10/2016 | Markman et al. |
| 2016/0321362 A1 | 11/2016 | Lytkin et al. |
| 2016/0343005 A1 | 11/2016 | Liu et al. |
| 2016/0379170 A1* | 12/2016 | Pande ............... G06Q 10/06 705/321 |
| 2017/0004454 A1 | 1/2017 | Tang et al. |
| 2017/0032386 A1* | 2/2017 | Borza ............... G06Q 30/0201 |
| 2017/0109850 A1* | 4/2017 | Chetlur ............... G06Q 50/2057 |
| 2017/0236095 A1* | 8/2017 | Schreiber ............... G06Q 10/1053 705/321 |
| 2017/0249594 A1 | 8/2017 | Ortigas et al. |
| 2017/0255997 A1 | 9/2017 | Watson |
| 2017/0270456 A1* | 9/2017 | Branagh ............... G06Q 10/063112 |
| 2017/0301040 A1 | 10/2017 | Scafaria |
| 2018/0068271 A1 | 3/2018 | Abebe et al. |
| 2018/0173804 A1 | 6/2018 | Kenthapadi et al. |
| 2018/0174105 A1 | 6/2018 | Kenthapadi et al. |
| 2018/0174106 A1 | 6/2018 | Kenthapadi et al. |
| 2018/0189739 A1 | 7/2018 | Kenthapadi et al. |
| 2018/0218326 A1 | 8/2018 | Kenthapadi et al. |
| 2018/0218327 A1 | 8/2018 | Kenthapadi et al. |
| 2018/0218328 A1 | 8/2018 | Kenthapadi et al. |
| 2018/0225632 A1 | 8/2018 | Kenthapadi et al. |
| 2018/0225633 A1 | 8/2018 | Kenthapadi et al. |
| 2018/0232751 A1 | 8/2018 | Terhark et al. |
| 2018/0240071 A1 | 8/2018 | Kenthapadi et al. |
| 2018/0285822 A1 | 10/2018 | Kenthapadi et al. |
| 2018/0285824 A1 | 10/2018 | Kenthapadi et al. |
| 2018/0315019 A1 | 11/2018 | Kenthapadi et al. |

OTHER PUBLICATIONS

"Non Final Office Action Issued in U.S. Appl. No. 15/379,624", dated Jan. 31, 2019, 40 Pages.

"Non Final Office Action Issued in U.S. Appl. No. 15/379,676", dated Jan. 25, 2019, 35 Pages.

"Non Final Office Action Issued in U.S. Appl. No. 15/379,686", dated Jan. 24, 2019, 37 Pages.

"Non Final Office Action Issued in U.S. Appl. No. 15/419,174", dated Jan. 11, 2019, 12 Pages.

"Non Final Office Action Issued in U.S. Appl. No. 15/419,231", dated Jan. 18, 2018, 12 Pages.

"Non Final Office Action Issued in U.S. Appl. No. 15/424,051", dated Feb. 8, 2019, 25 Pages.

"Non Final Office Action Issued in U.S. Appl. No. 15/424,082", dated Mar. 21, 2019, 31 Pages.

"Examiner Interview Summary Issued in U.S. Appl. No. 15/478,802", dated Mar. 1, 2019, 3 Pages.

"Non Final Office Action Issued in U.S. Appl. No. 15/478,802", dated Nov. 28, 2018, 15 Pages.

Wheelan, Susan A., "Group Size, Group Development, and Group Productivity", In SAGE Publications, vol. 40, Issue 2, Apr. 2009, pp. 247-262.

Fitzpatrick, et al. "Forming effective Worker Teams with Multi-functional Skill Requirements" In Journal of Computers & Industrial Engineering vol. 48, Issue 3, May 2005, pp. 593-608.

"Applicant Initiated Interview Summary Issued in U.S. Appl. No. 15/379,624", dated Apr. 26, 2019, 4 Pages.

"Non Final Office Action Issued in U.S. Appl. No. 15/379,624", dated Sep. 30, 2019, 42 Pages.

"Applicant Initiated Interview Summary Issued in U.S. Appl. No. 15/379,676", dated May 21, 2019, 4 Pages.

"Final Office Action Issued in U.S. Appl. No. 15/379,676", dated Jul. 30, 2019, 51 Pages.

"Applicant Initiated Interview Summary Issued in U.S. Appl. No. 15/379,686", dated Apr. 26, 2019, 04 Pages.

"Final Office Action Issued in U.S. Appl. No. 15/379,686", dated Aug. 14, 2019, 42 Pages.

"Applicant Initiated Interview Summary Issued in U.S. Appl. No. 15/419,174", dated Apr. 26, 2019, 03 Pages.

"Final Office Action Issued in U.S. Appl. No. 15/419,174", dated Aug. 6, 2019, 13 Pages.

"Applicant Interview Summary Issued in U.S. Appl. No. 15/419,231", dated Apr. 26, 2019, 3 Pages.

"Final Office Action Issued in U.S. Appl. No. 15/419,231", dated Aug. 7, 2019, 14 Pages.

"Non Final Office Action Issued in U.S. Appl. No. 15/424,051", dated Oct. 21, 2019, 41 Pages.

"Non Final Office Action Issued in U.S. Appl. No. 15/437,649", dated Sep. 9, 2019, 36 Pages.

"Final Office Action Issued in U.S. Appl. No. 15/478,802", dated May 21, 2019, 16 Pages.

"Final Office Action Issued in U.S. Appl. No. 15/478,843", dated Oct. 10, 2019, 15 Pages.

(56) References Cited

OTHER PUBLICATIONS

"Non Final Office Action Issued in U.S. Appl. No. 15/478,843", dated May 9, 2019, 11 Pages.
"Non Final Office Action Issued in U.S. Appl. No. 15/499,594", dated Aug. 2, 2019, 14 Pages.
Kapur, et al., "Ranking Universities Based on Career Outcomes of Graduates", In Proceedings of the 22nd ACM SIGKDD International Conference on Knowledge Discovery and Data Mining, Aug. 17, 2016, pp. 137-144.

* cited by examiner

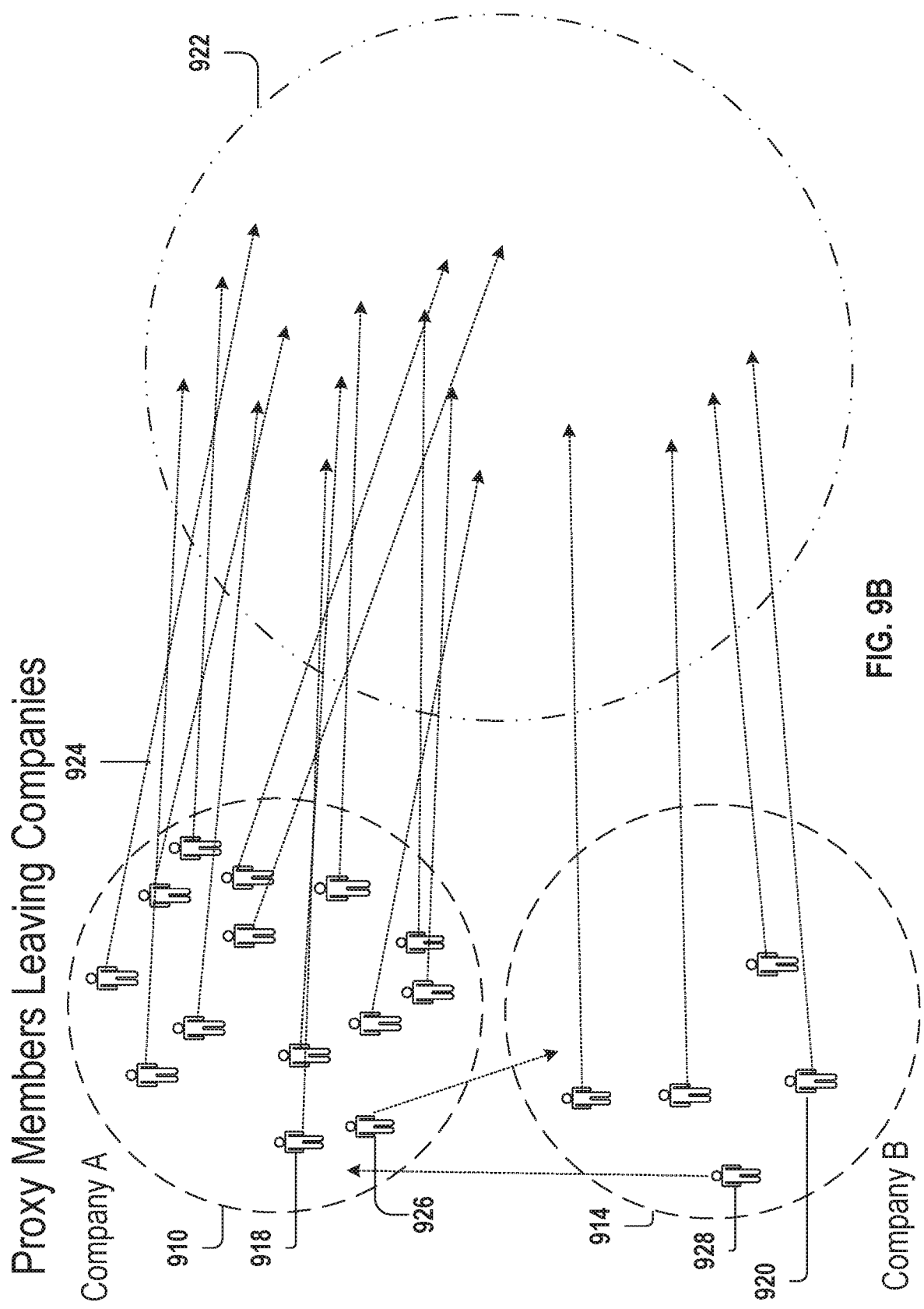

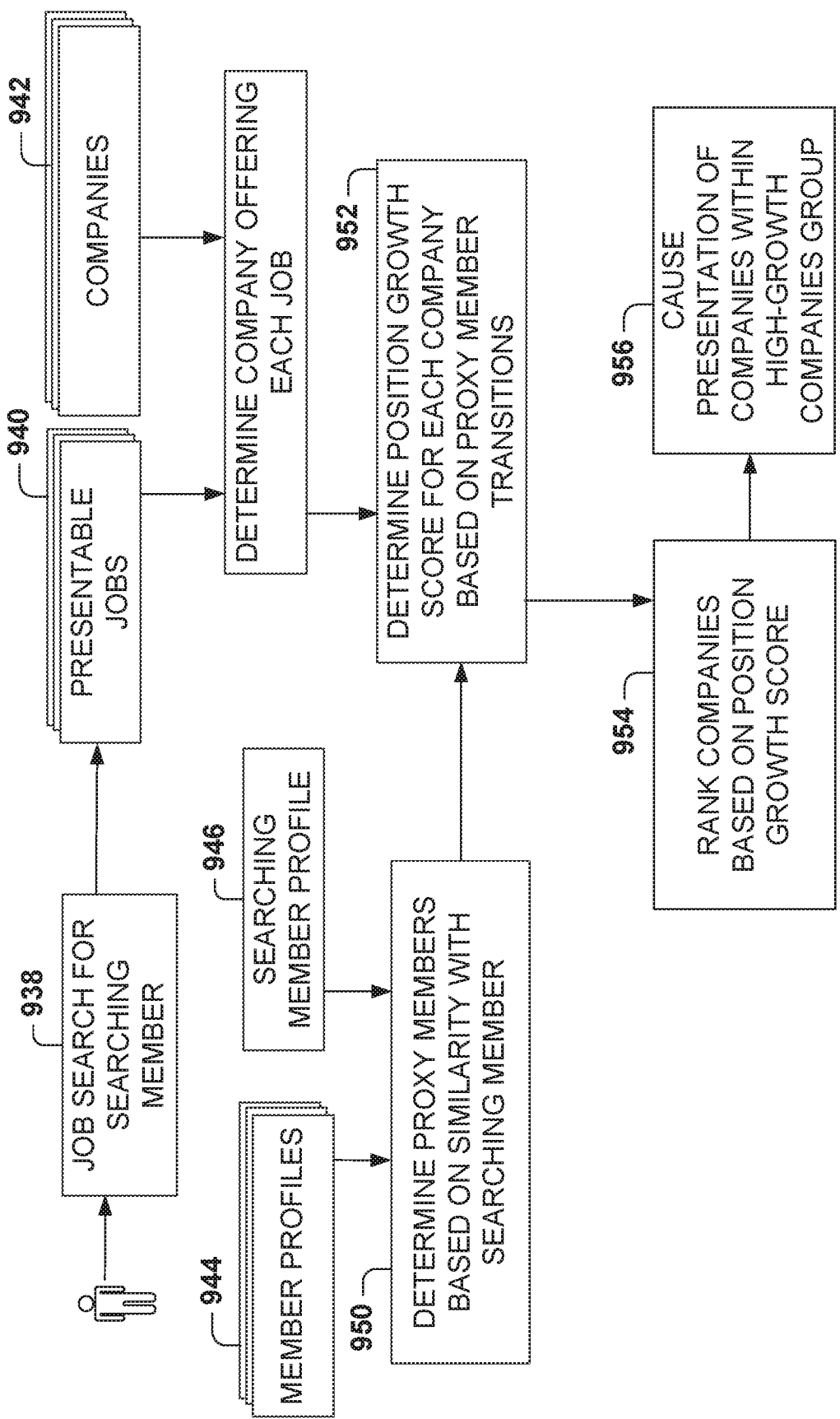
FIG. 9D RANKING JOBS BASED ON POSITION GROWTH SCORE ately, according to some embodiments.

RANKING JOB OFFERINGS BASED ON GROWTH POTENTIAL WITHIN A COMPANY

TECHNICAL FIELD

The subject matter disclosed herein generally relates to methods, systems, and programs for finding quality job offerings for a member of a social network.

BACKGROUND

Some social networks provide job postings to their members. The member may perform a job search by entering a job search query, or the social network may suggest jobs that may be of interest to the member. However, current job search methods may miss valuable opportunities for a member because the job search engine limits the search to specific parameters. For example, the job search engine may look for matches of a job title to the member's job title, but there may be quality jobs that are associated with a different title that would be of interest to the member.

Further, existing job search methods may focus only on the job description or the member's profile, without considering the member's preferences for job searches that go beyond the job description or other information that may help find the best job postings for the member.

BRIEF DESCRIPTION OF THE DRAWINGS

Various ones of the appended drawings merely illustrate example embodiments of the present disclosure and cannot be considered as limiting its scope.

FIG. 9B is a diagram that depicts groups of proxy members, employed at a first company or a second company, leaving their respective company, according to some example embodiments.

FIG. 9D is an additional illustration of a method for calculating a position growth score for each company by analyzing transitions of proxy members.

DETAILED DESCRIPTION

Figure 1:
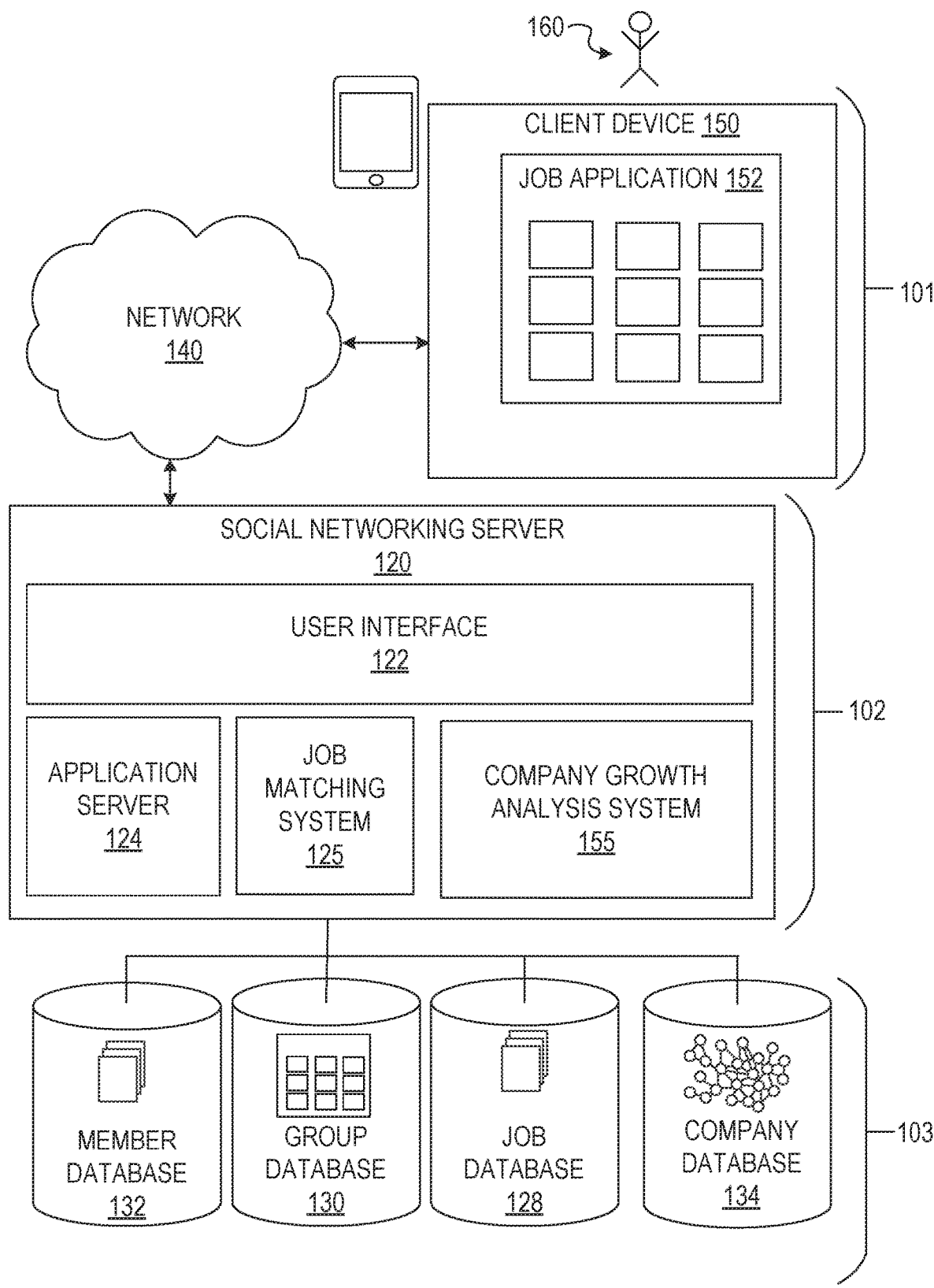
FIG. 1 is a block diagram illustrating a network architecture, according to some example embodiments, including a social networking server.

Example methods, systems, and computer programs are directed to grouping job postings for presentation to a user in response to a search. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

One of the goals of the present embodiments is to personalize and redefine how job postings are searched and presented to job seekers. Another goal is to explain better why particular candidate jobs are recommended to the job seekers. The presented embodiments provide, to both active and passive job seekers, valuable job recommendation insights, thereby greatly improving their ability to find and assess jobs that meet their needs.

Instead of providing a single job recommendation list for a member, embodiments presented herein define a plurality of groups, and the job recommendations are presented within the groups. Each group provides an indication of a feature that is important to the member for selecting from the group, such as the growth potential within the hiring company, how many people have transitioned from the university of the member to the company of the job, who would be a virtual team for the member if the member joined the company, and so forth. Thus, the embodiments are able to provide insight into the methods of job selection to the member by providing groups of jobs, with all jobs in each group sharing one or more features. Thus, the member is given insight into why certain jobs are presented within a particular group.

Embodiments presented herein determine companies that are rapidly growing with regard to employment of people similar to the member. Thus, the system is able to provide insight about which companies are hiring people with similar skills or backgrounds to those of the member. Further, insight can be provided as to a rate of how each company is hiring people similar to a member. Additionally, how many employees are leaving the company may be tracked to measure the attrition rate of employees similar to the member. Thus, the member can be notified of which companies, and thus which jobs, would be worthwhile to apply when considering current hiring trends.

One general aspect includes a method for determining a first skill set for the searching member on a social network, the first skill set being based on one or more skills identified in a profile of the searching member. The method also includes operations for identifying a plurality of jobs presentable to the searching member, each job offered by a company, and identifying a plurality of proxy members based on each of the proxy members having a skill set similar to the first skill set. The method also includes operations for determining a position growth score for each company offering one or more of the plurality of jobs, the position growth score based on a change in the number of proxy members at the company over a predetermined period of time. The method also includes operations to rank the companies based on the position growth scores and operations for presenting the jobs within a high-growth companies group area in an order based on the ranking.

In some embodiments, the identifying of proxy members having a skill set similar to the first skill set further includes identifying a similarity value for each proxy member, the similarity value derived using a machine-learning program. Further, the determining of the position growth score for a company may be based on the similarity values of proxy members that joined the company during a predetermined period of time and proxy members that left the company during the predetermined period of time. In some embodiments, the position growth score for a company may further be based a number jobs offered by the company that are associated with one or more skills in the first skill set. In some embodiments, the position growth score may further be based on the number of employees who have joined or left the company relative to the size of the company, or on how recently the proxy members have joined or left the company. Finally, in some embodiments, the identifying of the plurality of proxy members is further based identifying an education background within the profile of the searching member and the proxy member, the education background indicating a level of education.

FIG. 1 is a block diagram illustrating a network architecture, according to some example embodiments, including a social networking server 120. As shown in FIG. 1, the network architecture includes three layers: a data layer 103, an application logic layer 102, and a device layer 101. The layers communicate over a network 140 (e.g., the Internet). The data layer 103 includes several databases, including a member database 132 for storing data for various entities of the social networking server 120, including member profiles, company profiles, and educational institution profiles, as well as information concerning various online or offline groups. Of course, in various alternative embodiments, any number of other entities might be included in a social graph, and as such, various other databases may be used to store data corresponding with other entities.

Consistent with some embodiments, when a person initially registers to become a member of the social networking server 120, the person will be prompted to provide some personal information, such as his or her name, age (e.g., birth date), gender, interests, contact information, home town, address, spouse's and/or family members' names, educational background (e.g., schools, majors, etc.), current job title, job description, industry, employment history, skills, professional organizations, interests, and so on. This information is stored, for example, as member attributes in the member database 132.

Additionally, the data layer 103 includes a job database 128 for storing job data. The job data includes information collected from a company offering a job, including experience required, location, duties, pay, and other information. This information is stored, for example, as job attributes in the job database 128.

Additionally, the data layer 103 includes a company database 134 for storing data such as company data, including company name, industry associated with the company, number of employees at the company, address of the company, overview description of the company, and job postings associated with the company. Additionally, the company data includes inbound information that tracks members who have joined (i.e., become employed at) a company over a predetermined period of time, such as the last 30 days. Similarly, the company data includes outbound information that tracks members who have left the company over the predetermined period of time.

Once registered, a member may invite other members, or be invited by other members, to connect via the social networking server 120. A "connection" may specify a bilateral agreement by the members, such that both members acknowledge the establishment of the connection. Similarly, in some embodiments, a member may elect to "follow" another member. In contrast to establishing a connection, the concept of "following" another member typically is a unilateral operation, and at least in some embodiments, does not prompt acknowledgement or approval by the member who is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking server 120. In some example embodiments, because the content selection algorithm selects content relating to or associated with the particular entities that a member is connected with or is following, as a member connects with and/or follows other entities, the universe of available content items for presentation to the member in his or her content stream increases.

Additionally, the data layer 103 includes a group database 130 for storing group data. The group database 130 includes information about groups (e.g., clusters) of jobs that have job attributes in common with each other. The group data includes various group features comprising a characteristic for the group, as discussed in more detail below. This information is stored, for example, as group attributes in the group database 130.

As members interact with various applications, content, and user interfaces of the social networking server 120, information relating to the member's activity and behavior may be stored in a database, such as the member database 132 and the job database 128.

The social networking server 120 may provide a broad range of other applications and services that allow members the opportunity to share and receive information, often customized to the interests of the member. In sonic embodiments, members of the social networking server 120 may be able to self-organize into groups, or interest groups, organized around subject matter or a topic of interest. In some embodiments, members may subscribe to or join groups affiliated with one or more companies. For instance, in some embodiments, members of the social networking server 120 may indicate an affiliation with a company at which they are employed, such that news and events pertaining to the company are automatically communicated to the members in their personalized activity or content streams. In some embodiments, members may be allowed to subscribe to receive information concerning companies other than the company with which they are employed. Membership in a group, a subscription or following relationship with a company or group, and an employment relationship with a company are all examples of different types of relationships that may exist between different entities, as defined by the social graph and modeled with social graph data of the member database 132.

The application logic layer 102 includes various application server modules 124, which, in conjunction with a user interface module 122, generate various user interfaces with data retrieved from various data sources or data services in the data layer 103. In some embodiments, individual application server modules 124 are used to implement the functionality associated with various applications, services, and features of the social networking server 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, the social networking server 120 may include a job matching system 125, which creates a job display on a job application 152 on a client device 150. Also included in the social networking server 120 is a company growth analysis system 155, which calculates scores representing company growth of companies associated with members similar to a searching member 160, ranks the companies based on the scores, and causes a display of companies ranked by score that is viewable on the job application 152 by the searching member 160.

Figure 2:
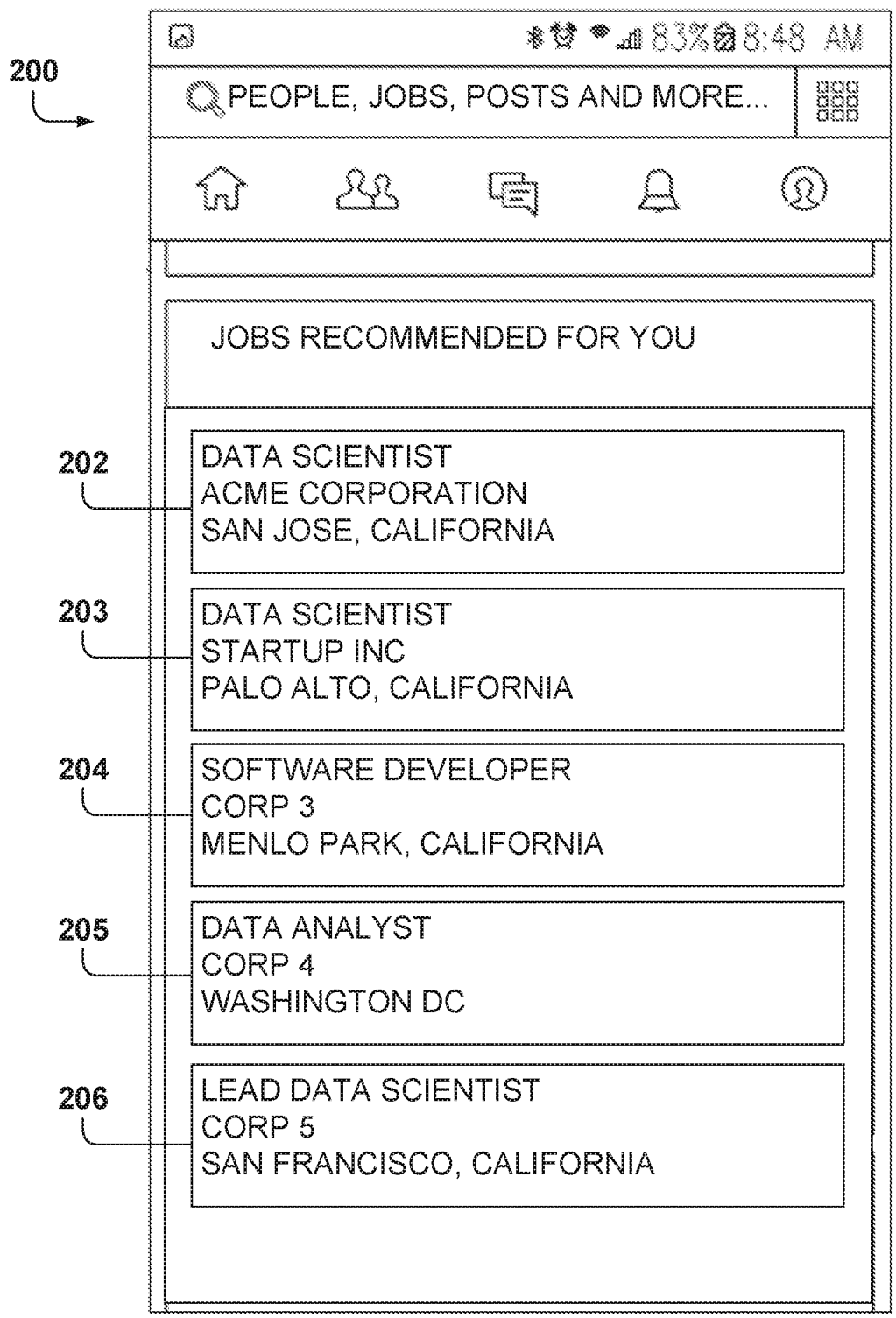
FIG. 2 is a screenshot of a user interface that includes job recommendations, according to some example embodiments.

FIG. 2 is a screenshot of a user interface 200 that includes recommendations for jobs 202-206 within the job application 152, according to some example embodiments. In one example embodiment, the user interface 200 provides job recommendations, which are job postings that match the job interests of the user and that are presented without a specific job search request from the user (e.g., job suggestions).

In another example embodiment, a job search interface is provided for entering job searches, and the resulting job matches are presented to the user in the user interface 200.

As the user scrolls down the user interface 200, more job recommendations are presented to the user. In some example embodiments, the job recommendations are prioritized to present jobs in an estimated order of interest to the user.

The user interface 200 presents a "flat" list of job recommendations as a single list. Other embodiments presented below utilize a "segmented" list of job recommendations where each segment is a group that is associated with a related reason indicating why these jobs are being recommended within the group.

Figure 3:
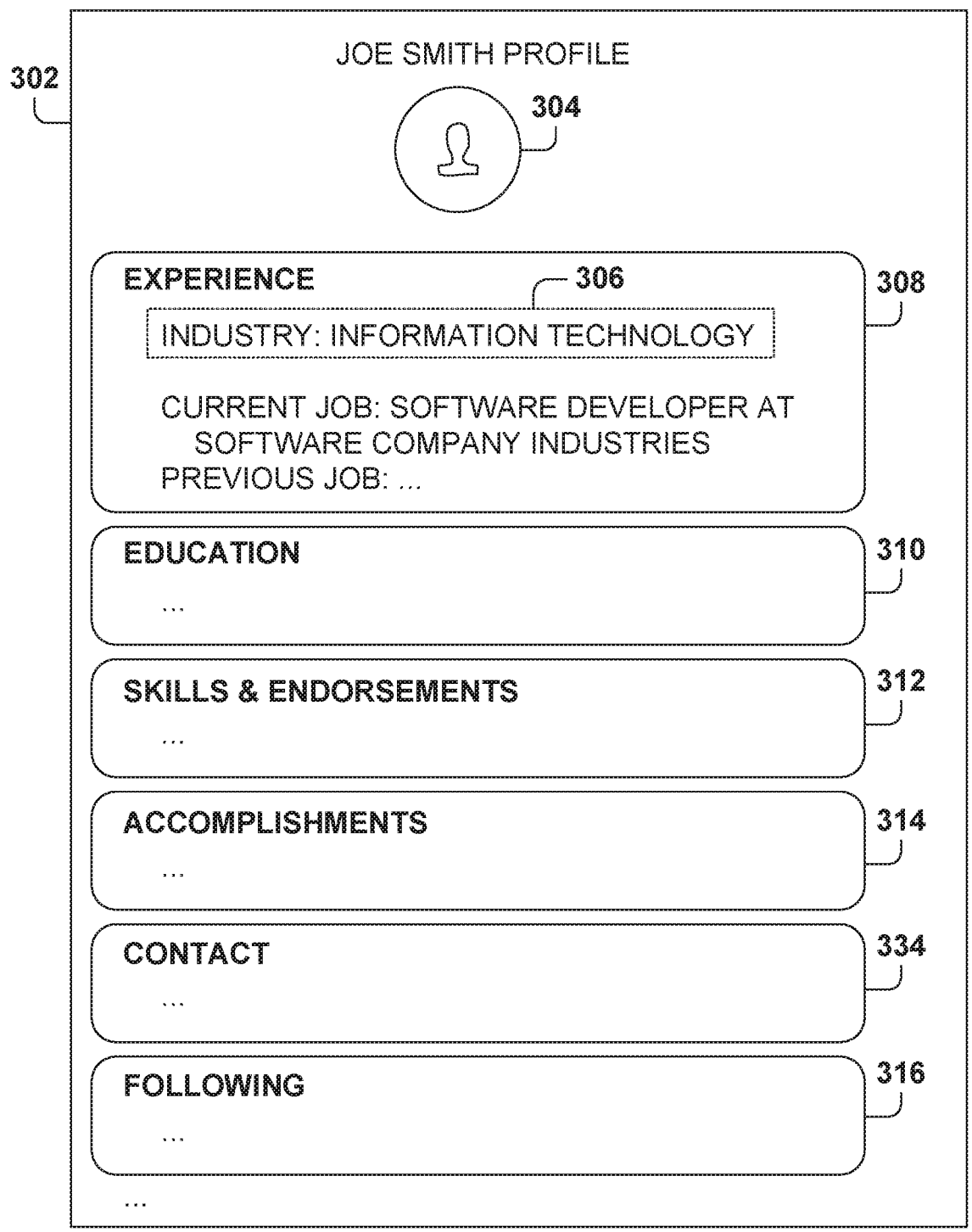
FIG. 3 is a screenshot of a user's profile view, according to some example embodiments.

FIG. 3 is a screenshot of a member's profile view, according to some example embodiments. Each member in the social network has a member profile 302, which includes information about the member. The member profile 302 is configurable by the member and also includes information based on the member's activity in the social network (e.g., likes, posts read).

In one example embodiment, the member profile 302 may include information in several categories, such as a profile picture 304, experience 308, education 310, skills and endorsements 312, accomplishments 314, contact information 334, following 316, and the like. Skills include professional competences that the member has, and the skills may be added by the member or by other members of the social network. Example skills include C++, Java, Object-oriented Programming, Data Mining, Machine Learning, Data Science, and the like. Other members of the social network may endorse one or more of the skills and, in some example embodiments, the member's account is associated with the number of endorsements received for each skill from other members.

The experience 308 information includes information related to the professional experience of the member. In one example embodiment, the experience 308 information includes an industry 306, which identifies the industry in which the member works. In one example embodiment, the member is given an option to select an industry 306 from a plurality of industries when entering this value in the member profile 302. The experience 308 information area may also include information about the current job and previous jobs held by the member.

The education 310 information includes information about the educational background of the member, including the educational institutions attended by the member, the degrees obtained, and the field of study of the degrees. For example, a member may list that the member attended the University of Michigan and obtained a graduate degree in computer science. For simplicity of description, the embodiments presented herein are presented with reference to universities as the educational institutions, but the same principles may be applied to other types of educational institutions, such as high schools, trade schools, professional training schools, and the like.

The skills and endorsements 312 information includes information about professional skills that the member has identified as having been acquired by the member and endorsements entered by other members of the social network supporting the skills of the member. The accomplishments 314 area includes accomplishments entered by the member, and the contact information 334 includes contact information for the member, such as an email address and phone number. The following 316 area includes the names of entities in the social network being followed by the member.

The skills within the skills and endorsements 312 information are aggregated by the system to form a skill set for the member that can be compared to skill sets of other members. In some embodiments, this skill set is part of a member characteristic for the member, the member characteristic including information such as the skill set for the member, profile information, education 310 information, and other data that is further comparable to data of other members.

Figure 4:
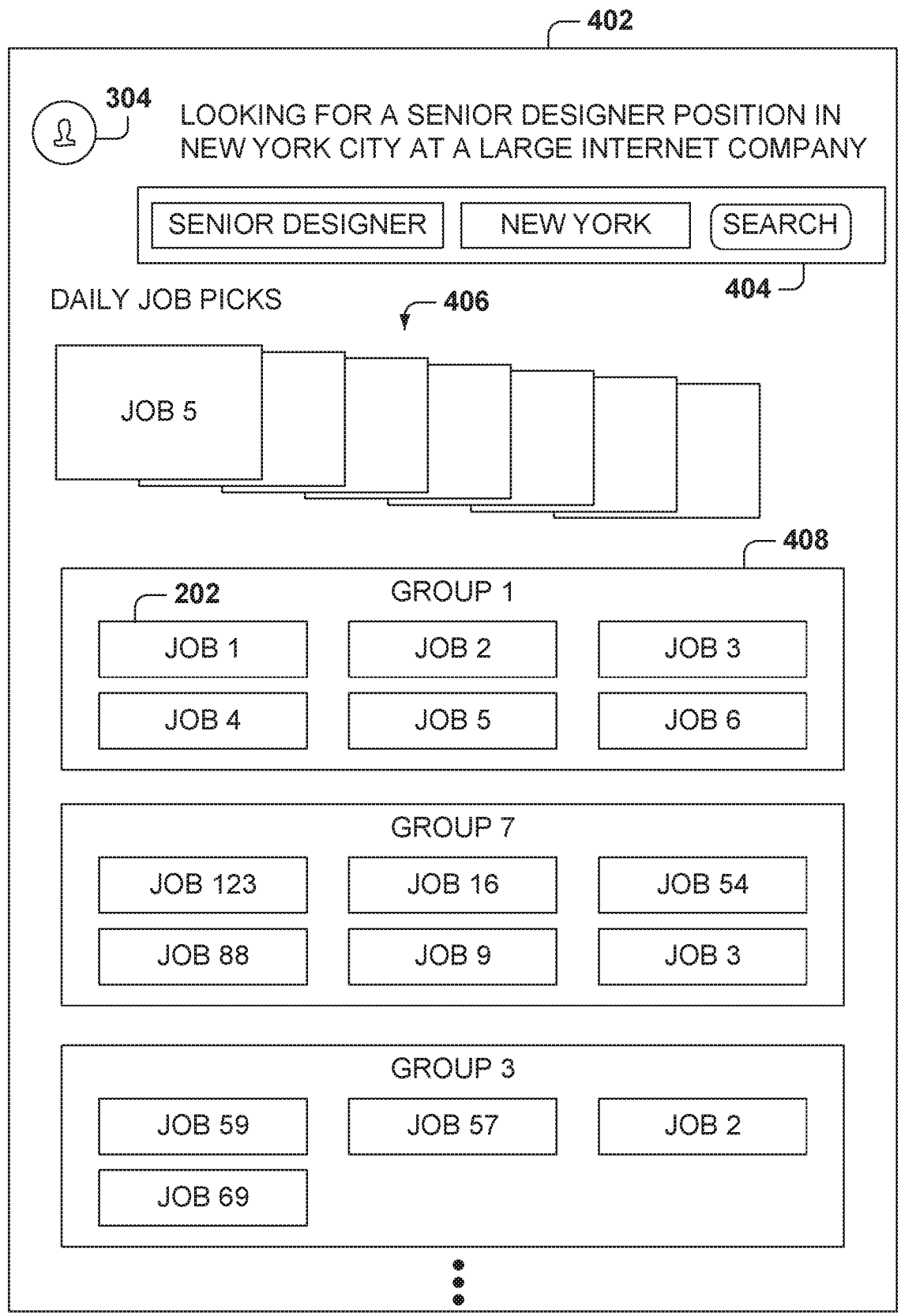
FIG. 4 is a diagram of a user interface, according to some example embodiments, for presenting job postings to a member of a social network.

FIG. 4 is a diagram of a user interface 402, according to some example embodiments, for presenting job postings to a member of the social network. The member interface 402 includes the profile picture 304 of the member, a search section 404, a daily jobs section 406, and one or more group areas 408. In some example embodiments, a message next to the profile picture 304 indicates the goal of the search, e.g., "Looking for a senior designer position in New York City at a large Internet company."

The search section 404, in some example embodiments, includes two boxes for entering search parameters: a keyword input box for entering any type of keywords for the search (e.g., job title, company name, job description, skill, etc.), and a geographic area input box for entering a geographic area for the search (e.g., New York). This allows members to execute searches based on keyword and location. In some embodiments, the geographic area input box includes one or more of city, state, ZIP code, or any combination thereof.

In some example embodiments, the search boxes may be prefilled with the member's title and location if no search has been entered yet. Clicking the search button causes the search of jobs based on the keyword inputs and location. It is to be noted that the inputs are optional, and only one search input may be entered at a time, or both search boxes may be filled in, The daily jobs section 406 includes information about one or more jobs selected for the member, based on one or more parameters, such as member profile data, search history, job match to the member, recentness of the job, whether the member is following the job, and so forth.

Each group area 408 includes one or more jobs 202 for presentation in the user interface 402. In one example embodiment, the group area 408 includes one to six jobs 202 with an option to scroll the group area 408 to present additional jobs 202, if available.

In some embodiments for a high-growth-companies group area 408, as described below, instead of presenting one to six jobs 202, the high-growth companies group area 408 presents one to six companies 502, as further shown on FIG. 5A. Each of the companies 502 in this embodiment can be selected to display a company display 510 with one to six jobs 512 offered by the selected company, as shown in FIG. 5B.

Each group area 408 provides an indication of why the member is being presented with those jobs, which identifies the characteristic of the group. There could be several types of reason related to factors such as the connection of the member to the job, the affinity of the member to the group, the desirability of the job, or the time deadline of the job (e.g., urgency). The reasons related to the connection of the member to the job may include relationships between the job and the social connections of the member (e.g., "Your connections can refer you to this set of jobs"), a quality of a fit between the job and the member characteristics (e.g., "This is a job from a company that hires from your school"), a quality of a match between the member's talent and the job (e.g., "You would be in the top 90% of all applicants"), and so forth.

In some example embodiments, the system accesses data about proxy members who are employed or have formerly been employed at the company. Proxy members, as used herein, are members who have similar skills to the searching member 160, e.g., the skill similarity score is above a predetermined threshold, as discussed in more detail below. Since there is a high degree of skill similarity between the searching member 160 and the proxy members, the system may use the proxy members to calculate an affinity between the searching member and a job or company, which indicates a likelihood that the company will hire the searching member based on the company recently hiring a greater number of proxy members, while losing a lesser number of proxy members (thus, the company is growing with respect to the proxy members)

For example, the system assigns a score to each company based on the number of proxy members who are connections with the member, in addition to a level of similarity between each proxy member and the member. Further, the system can use data about the connections to determine a rate at which proxy members are joining or leaving the company and determine a score based on the rate of growth of the number of jobs, of people with similar skills to the member, within the company.

Further, the group characteristics may be implicit (e.g., "These jobs are recommended based on your browsing history") or explicit (e.g., "These are jobs from companies you followed"). The desirability reasons may include popularity of the job in the member's area (e.g., most-viewed by other members or most applications received), popularity of the company associated with the job in the member's area, and popularity of the job among people with the same title as the member. Further, the time-urgency reasons may include "Be the first to apply to these jobs" or "These jobs will be expiring soon."

It is to be noted that the embodiments illustrated in FIG. 4 are examples and do not describe every possible embodiment. Other embodiments may utilize different layouts or groups, present fewer or more jobs, present fewer or more groups, etc. The embodiments illustrated in FIG. 4 should therefore not be interpreted to be exclusive or limiting, but rather illustrative.

Figure 5A:
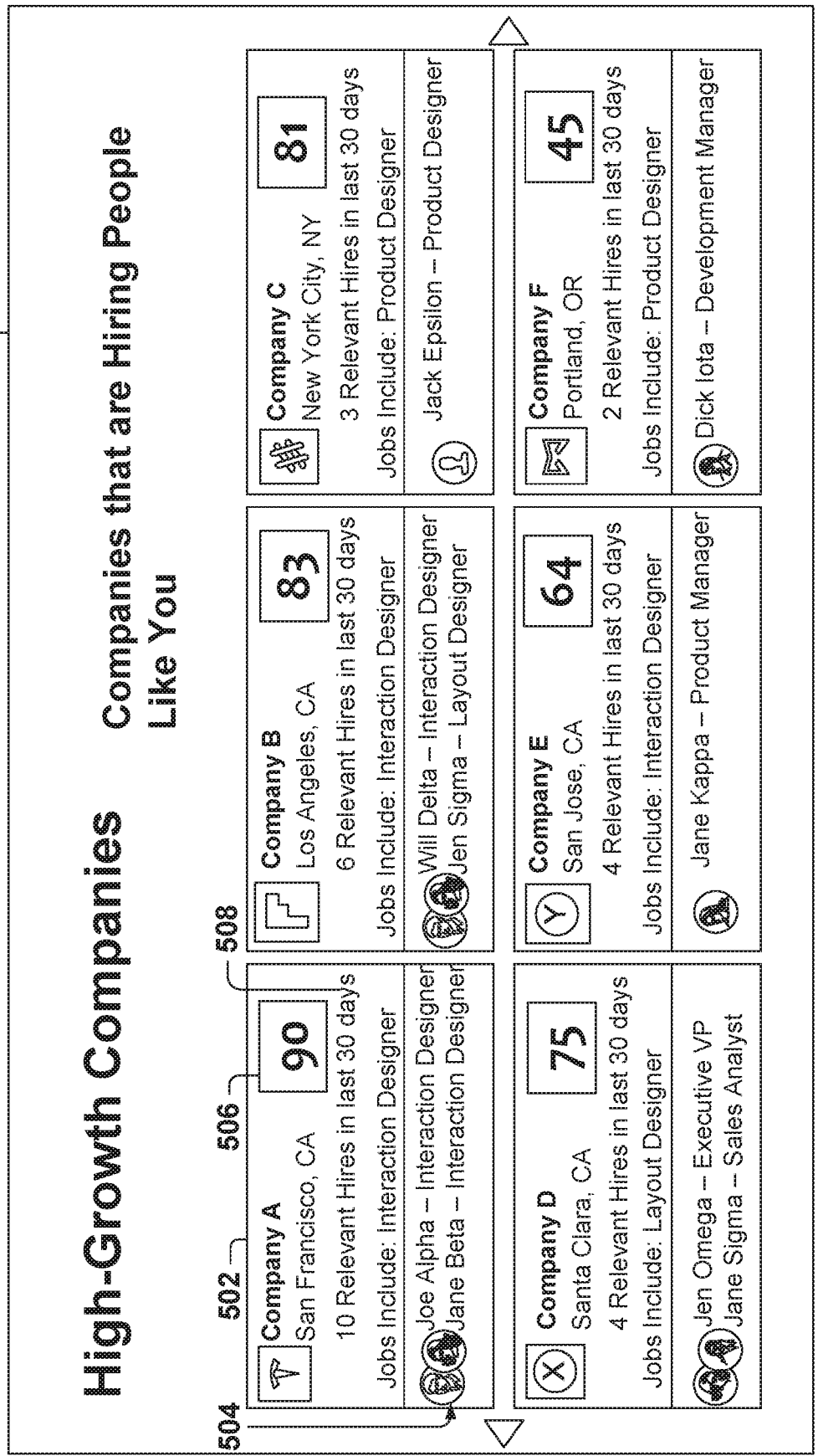
FIG. 5A is a detail of a "high-growth companies" group area in a user interface, according to some example embodiments.
Figure 5B:
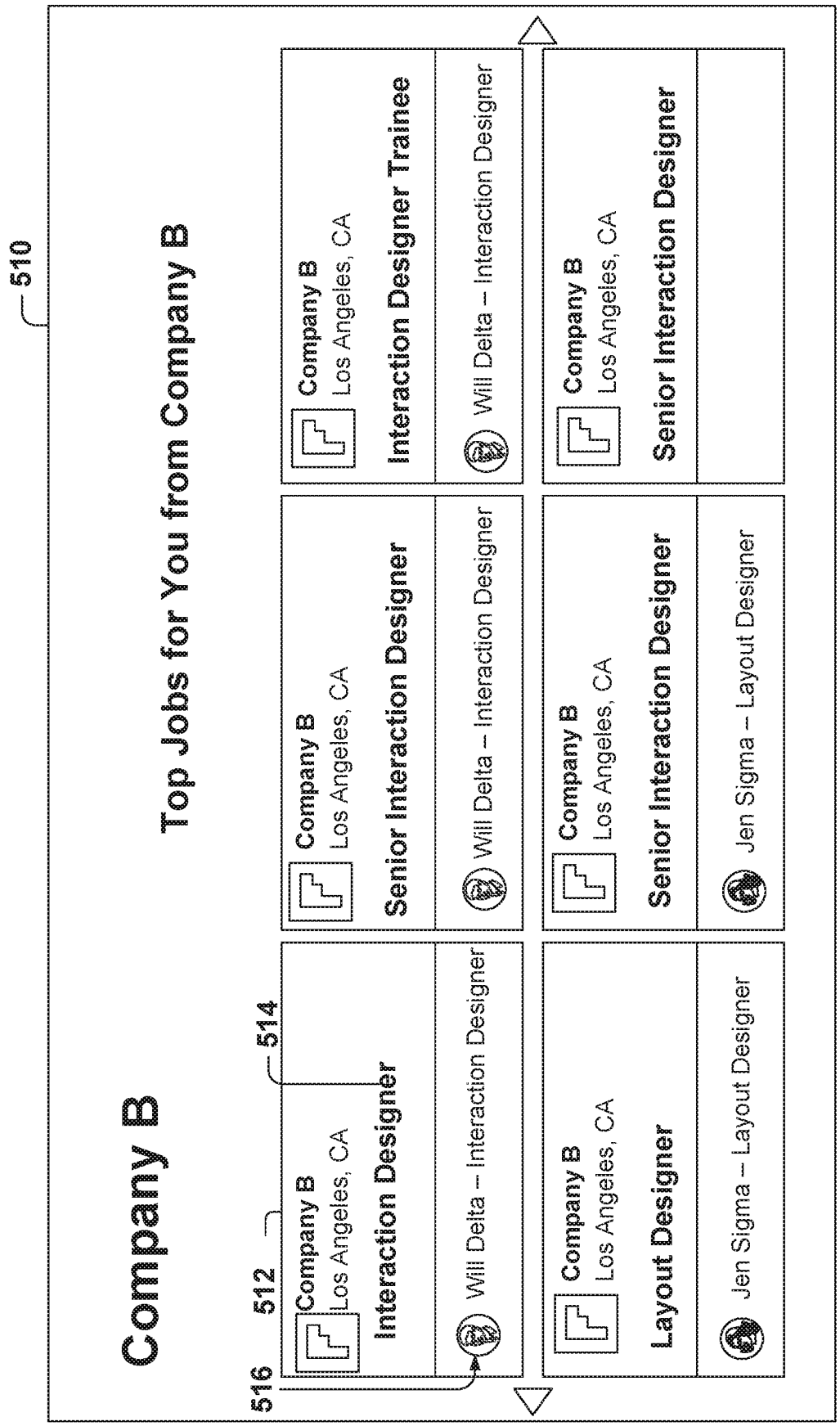
FIG. 5B is a detail of a company display showing jobs available within a specific company, according to some example embodiments.

FIG. 5A is a detail of a high-growth-companies group area 408 in the user interface, according to some example embodiments. In one example embodiment, the high-growth-companies group area 408 includes recommendations of companies, and one or more jobs offered by the companies. The high-growth-companies group area 408 provides a plurality of company displays 502 that are currently trending among proxy members. For example, the information about the company includes the name of the company, the location of the company, and an example of what jobs the company is offering ("Jobs Include"). In an example embodiment, each company display 502 includes a position growth score 506. As used herein, a position growth score is a measure of how rapidly the number of proxy members in the company is growing, giving insight into how the company is growing relative to members who are similar to the searching member 160. Further, as used herein "position" represents a scope of duties at a company that can be fulfilled by a skill set. For example, the jobs "software developer" and "programmer" may have different titles, but could both be positions for a member who has a software coding background.

In some embodiments, the system determines proxy members by determining a similarity value between the searching member 160 and other members, such as by using a machine-learning system. Proxy members are those members of the social network having a similarity value above a predetermined threshold. The system may use the similarity values of the proxy members to calculate the position growth score. The position growth score may also be based on interactions from other members, the location of the jobs held by the proxy members, and interactions of members in the searching member's 160 social network that are currently or formerly employed by the company offering the job.

In some example embodiments, the high-growth-companies group area 408 includes profile pictures 504 within the company displays 502 of members who are connected to the searching member 160 and also are employed at the respective company. In some example embodiments, the high-growth companies group area 408 further includes a proxy counter display 508 that shows the number of proxy members who have been hired (relevant hires) at the company within a predetermined time period (in this example display, the time period is 30 days, but other periods may be used, such as a week, six months, a year, two years, etc.).

FIG. 5B is a detail of a company display 510 showing jobs 512 available within a specific company, according to some example embodiments. The company display 510 is a screen that the system presents to the member in response to the member selecting a specific company within the high-growth-companies group area 408, such as Company B, as shown in FIG. 5B. In some example embodiments, the jobs 512 are presented to the member in response to a selection of the company by the member. Additionally, the company display 510 shows the title of the job 514 within each job 512, employees who work for the company and have a similar job 516, and optionally other information about the job. In some example embodiments, the jobs 512 are ranked within each company display 510 by one or more of the scores described in FIGS. 6-7, such as by a job-to-group score or job affinity score, with the jobs having higher scores ranked and displayed ahead of jobs that have lower scores.

Figure 6:
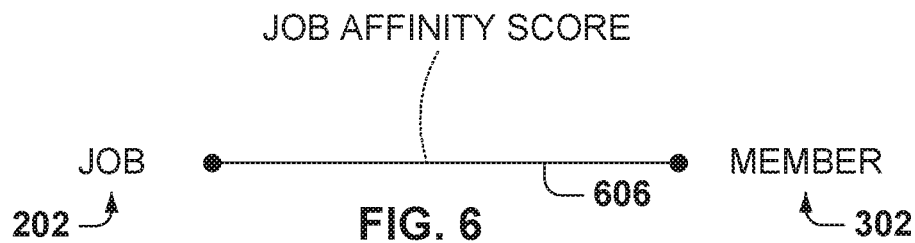
FIG. 6 illustrates the scoring of a job for a member, according to some example embodiments.
Figure 7:
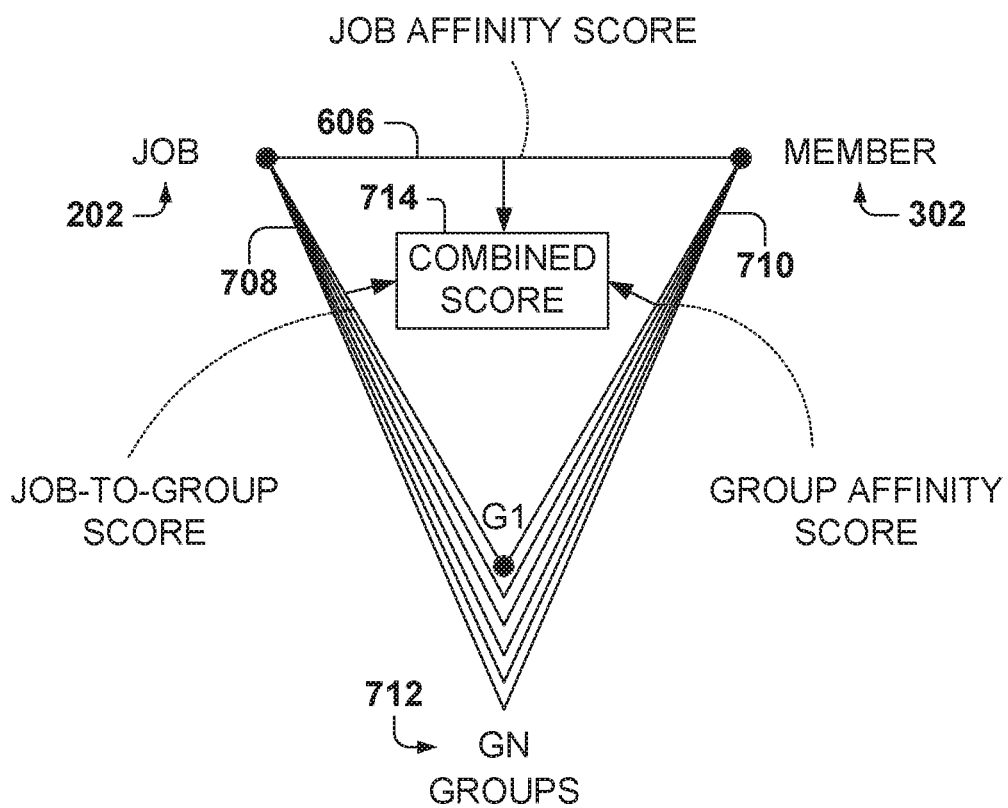
FIG. 7 further shows the scoring of the job for the member while incorporating groups, according to some example embodiments.

In some embodiments, the relationships between the searching member 160, proxy members, and jobs 512 are used in determining the position growth score for the company. FIGS. 6-7 illustrate the scoring of a job for a member, according to some example embodiments. FIG. 6 illustrates the scoring, also referred to herein as ranking, of a job 202 for a member associated with a member profile 302 based on a job affinity score 606.

The job affinity score 606, between the job 202 and the member profile 302, is a value that measures how well the job 202 matches the interest of the member associated with the member profile 302 in finding the job 202. A so-called "dream job" for a member would be the perfect job for the member and would have a high, or even maximum, job affinity score 606, while a job that the member is not interested in at all (e.g., in a different professional industry) would have a low job affinity score 606 in sonic example embodiments, the job affinity score 606 is a value between zero and one, or a value between zero and 100, although other ranges are possible.

In some example embodiments, a machine-learning program is used to calculate the job affinity scores 606 for the jobs 202 available to the member. The machine-learning program is trained with existing data in the social network, and the machine-learning program is then used to evaluate jobs 202 based on the features used by the machine-learning program. In some example embodiments, the features include any combination of job data (e.g., job title, job description, company, geographic location, etc.), member profile data, member search history, employment of social connections of the member, job popularity in the social network, number of days the job has been posted, company reputation, company size, company age, company type (profit vs. nonprofit), and pay scale. More details are provided below with reference to FIG. 10 regarding the training and use of the machine-learning program.

FIG. 7 illustrates the scoring of a job 202 for a member associated with the member profile 302, according to some example embodiments, based on three parameters: the job affinity score 606, a job-to-group score 708, and a group affinity score 710. Broadly speaking, the job affinity score 606 indicates how relevant the job 202 is to the member, the job-to-group score 708 indicates how relevant the job 202 is to a group 712, and the group affinity score 710 indicates how relevant the group 712 is to the member. Multiple groups 712 ranging from G1 (first group) to GN (final group) are shown in FIG. 7 as related to the job 202 and the member 302.

The group affinity score 710 indicates how relevant the group 712 is to the member, where a high group affinity score 710 indicates that the group 712 is very relevant to the member and should be presented in the user interface, while a low group affinity score 710 indicates that the group 712 is not relevant to the member and may be omitted from presentation in the user interface.

The group affinity score 710 is used, in some example embodiments, to determine which groups 712 are presented in the user interface, as discussed above, and the group affinity score 710 is also used to order the groups 712 when presenting them in the user interface, such that the groups 712 may be presented in the order of their respective group affinity scores 710. It is to be noted that if there is not enough "liquidity" of jobs for a group 712 (e.g., there are not enough jobs for presentation in the group 712), the group 712 may be omitted from the user interface or presented with lower priority, even if the group affinity score 710 is high.

In some example embodiments, a machine-learning program is utilized for calculating the group affinity score 710. The machine-learning program is trained with member data, including interactions of members with the different groups 712. The data for the particular member is then utilized by the machine-learning program to determine the group affinity score 710 for the member with respect to a particular group 712. The features utilized by the machine-learning program include the history of interaction of the member with jobs from the group 712, click data for the member (e.g., a click rate based on how many times the member has interacted with the group 712), member interactions with other members who have a relationship to the group 712, and the like. For example, one feature may include an attribute that indicates whether the member is a student. If the member is a student, features such as social connections or education-related attributes will be important to determine which groups are of interest to the student. On the other hand, a member who has been out of school for 20 years or more may not be as interested in education-related features.

Other data of interest includes the employee composition of a company, specifically whether employees of a company are similar to the searching member 160. This data can further indicate an increase (growth) or decrease of similar employees over a specified time, such as the previous 30 days. Such data can be located on a company database 134. An advantage to determining companies that are showing increases, or growth, in regard to members who are similar to the searching member 160, is that these companies may be more likely to hire the searching member 160. For example, a first company may be expanding their sales department and thus may have recently hired a large number of sales personnel relative to sales personnel who have left the company. In this example, the sales personnel are members who are similar to the searching member 160 because they share similar skills (e.g., sales). Thus, it would be beneficial for the member to see high-growth companies.

The job-to-group score 708 between a job 202 and a group 712 indicates the job 202's strength within the context of the group 712, where a high job-to-group score 708 indicates that the job 202 is a good candidate for presentation within the group 712 and a low job-to-group score 708 indicates that the job 202 is not a good candidate for presentation within the group 712. In some example embodiments, a predetermined threshold is identified, wherein jobs 202 with a job-to-group score 708 equal to or above the predetermined threshold are included in the group 712, and jobs 202 with a job-to-group score 708 below the predetermined threshold are not included in the group 712.

In some embodiments, companies that are offering jobs that proxy members of the searching member 160 are interacting with may provide better employment opportunities for the searching member 160 than other companies. For example, the system may determine a high position growth score for a first job based on a surge in applications by proxy members for the first job in the past year, as well as on the fact that a high number of proxy members are also applying to jobs offered by the company that is offering the first job. Similarly, the system may determine a high position growth score for a first company based on a surge of jobs offered by the first company being filled by proxy members. Further, the system may determine a high position growth score for a first company in response to a surge in jobs offered by the first company being filled, where the searching member 160 has a high job affinity score 606 for the jobs.

Figure 8:
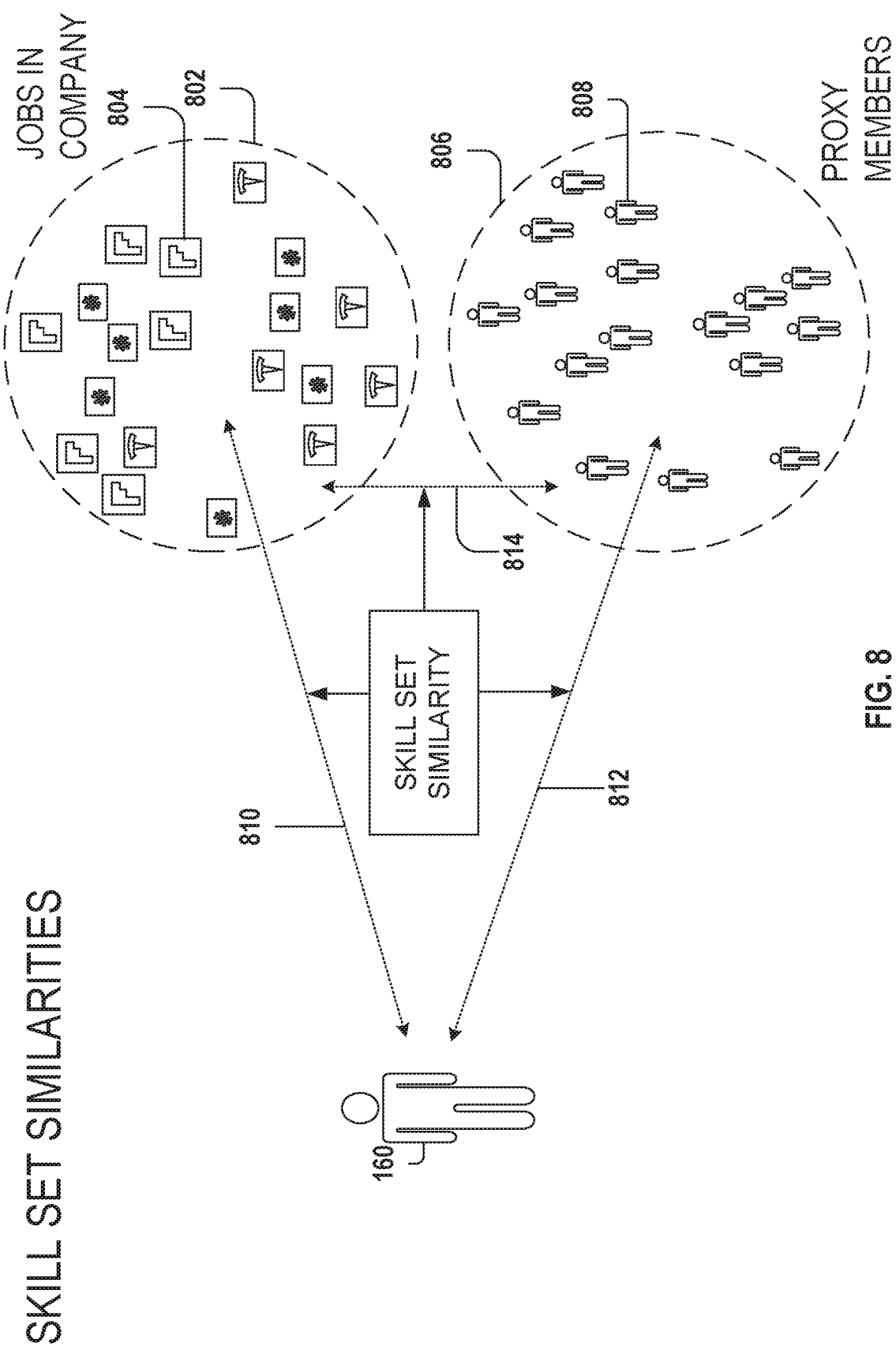
FIG. 8 is a diagram that depicts a comparison of skills included in the profile of a searching member with skills included in the profiles of a plurality of proxy members and skills in jobs offered by a company, according to some example embodiments.

In some example embodiments, the job affinity score 606, the job-to-group score 708, and the group affinity score 710 are combined to obtain a combined affinity score 714 for the job 202. The scores may be combined utilizing addition, weighted averaging, or other mathematical operations, FIG. 8 is a diagram that depicts a comparison of skills included in the profile of a searching member with skills included in the profiles of a plurality of proxy members and skills in jobs offered by a company, according to some example embodiments. FIG. 8 includes the searching member 160, a job aggregation 802 of jobs 804 from a first company, and a population 806 of proxy members 808. The searching member 160, each of the jobs 804, and each of the proxy members 808 have respective skill sets. In some embodiments, a machine-learning program compares the skill sets, such as the skill set of the searching member 160 to the skill set of one of the jobs 804 as shown in 810. In some embodiments, the result of this comparison may be used to calculate the job affinity score 606. Further, the machine-learning program may compare the skill set of a job 804 to the skill set of one of the proxy members 808 as shown in 814, and may compare the skill set of the searching member 160 to the skill set of one of the proxy members 808 as shown in 812. Techniques for determining a similarity between members and jobs and between members and other members are further disclosed below with reference to FIG. 10.

Figure 9A:
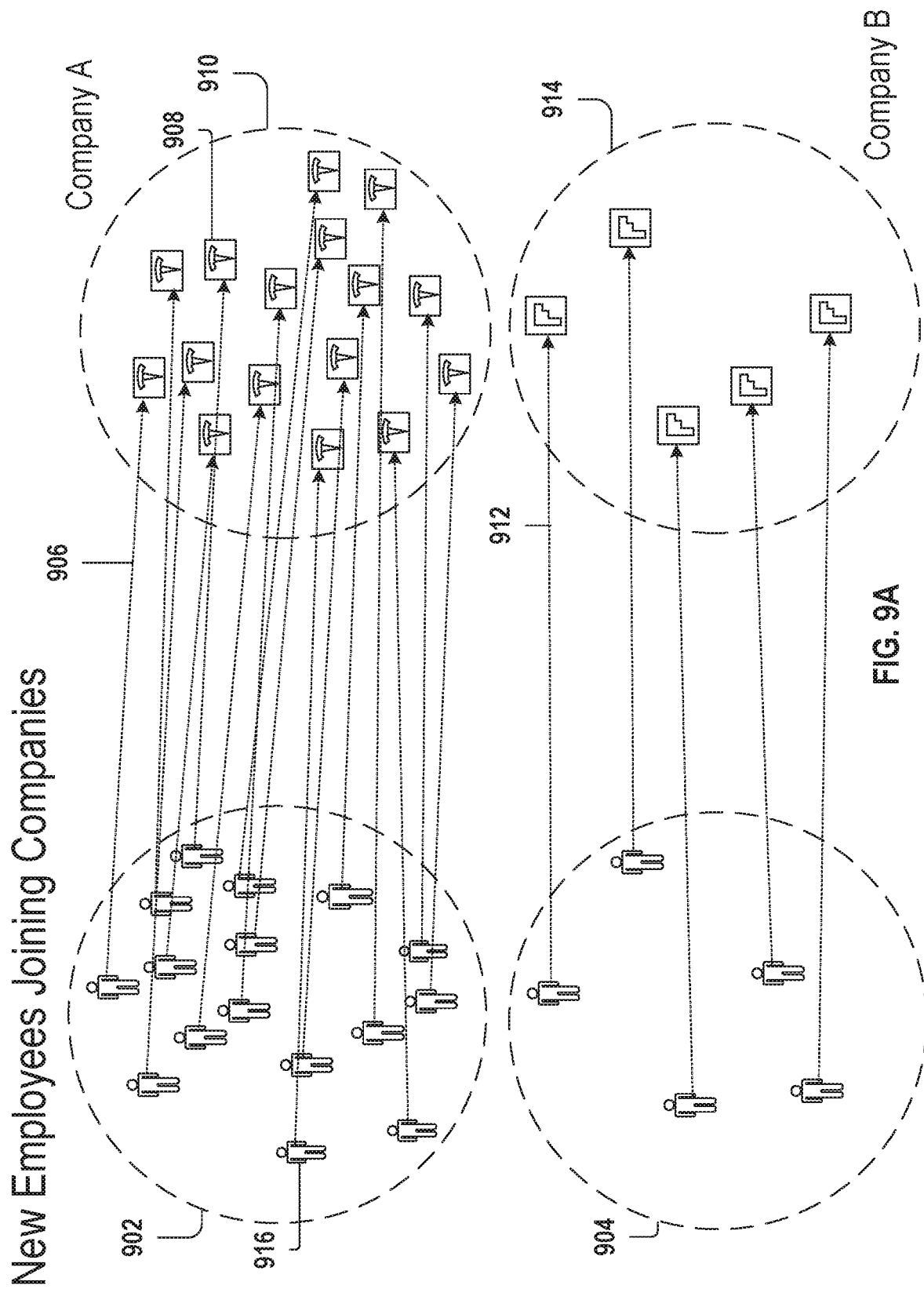
FIG. 9A is a diagram that depicts groups of proxy members who have attained employment at two companies during a predetermined period of time, according to some example embodiments.

FIG. 9A is a diagram that depicts groups of proxy members who have attained employment at two companies during a predetermined period of time, according to some example embodiments. FIG. 9A shows each of the proxy members 916 either joining 906 company A 910, or joining 912 company B 914. FIG. 9A further shows the proxy members 916 accepting specific jobs 908 within company A and company B.

In an example embodiment, a machine-learning program determines similarity values between the searching member 160 and other members on the social network based on the searching member 160 and the other members skills. The system then identifies proxy members 916 with similarity values above a predetermined threshold. The system then identifies proxy members who have joined new companies within a certain period (e.g., the last 90 days). FIG. 9A specifically shows movement into company A or into company B by proxy members 916 during the past 30 days, with each proxy member 916 moving into a specific job 908 with company A or company B.

FIG. 9B is a diagram that depicts groups of proxy members, employed at a first company or a second company, leaving their respective company, according to some example embodiments. It is helpful to assess the number of employees that join or leave a company to determine the growth of a company in regard to a certain position (e.g., associated with a certain skill set). For example, there is no growth in a position for a company when the same number of employees having a position in the company leave as employees who join the company in the position.

FIG. 9B shows an outbound transition 924 by the proxy members 918, 920 from both company A 910 and company B 914. The departing proxy members 918, 920 are moving into other employment positions 922, outside company A or company B. Further, some proxy members may leave company A for company B 926, or may leave company B for company A 928.

Continuing the above example for FIG. 9A, in FIG. 9B, the system has identified proxy members based on similarity values. The system then selects proxy members who have transitioned employment during the last 30 days. Displayed in the figure are specifically proxy members 918 in Company A and proxy members 920 in company B who have left the respective company within the last 30 days. Further, as shown in FIG. 9B, more employees have left company A during the last 30 days than have left company B.

Figure 9C:
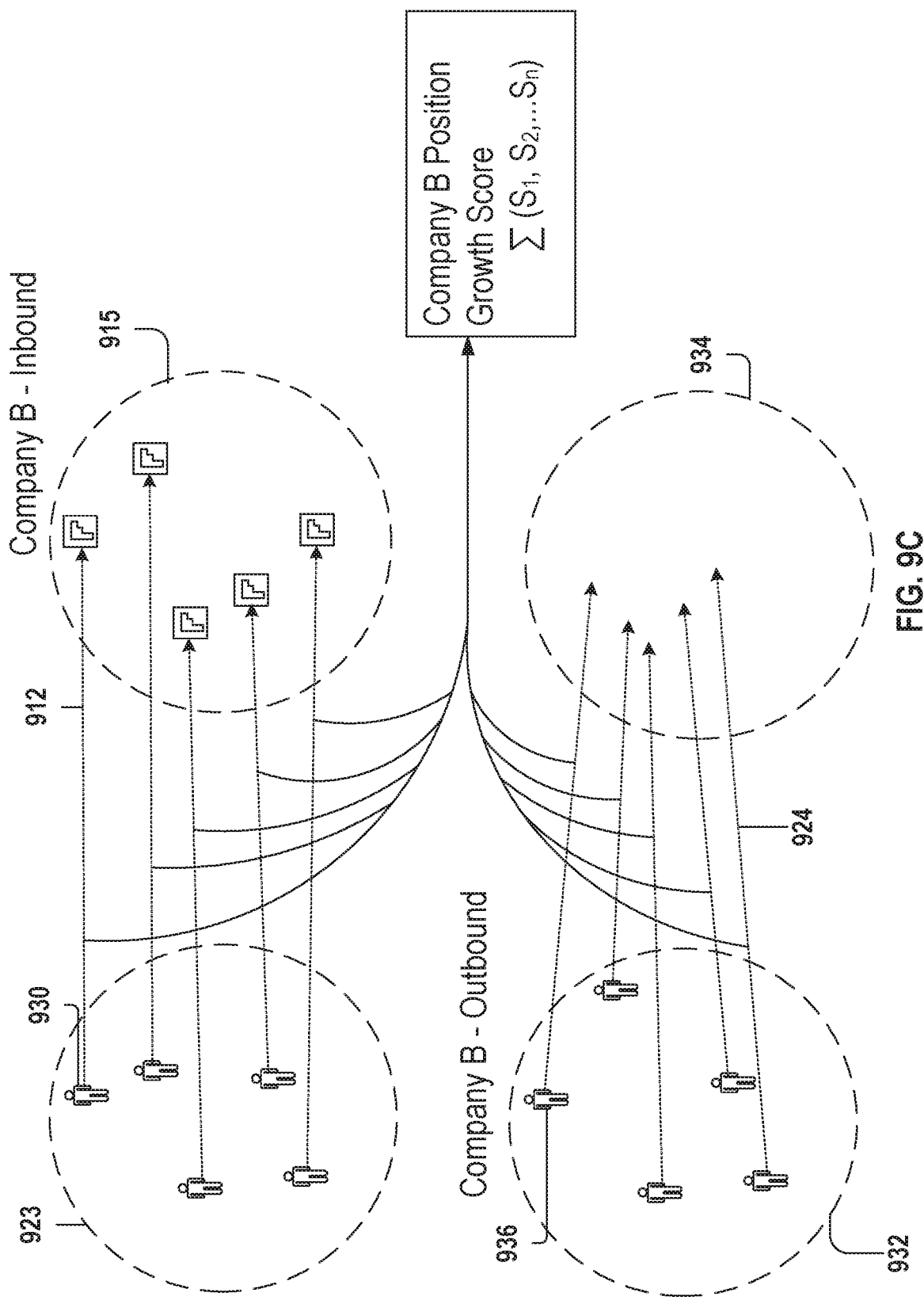
FIG. 9C is a diagram that depicts a group of proxy members joining a company and another group of proxy members leaving the company during the predetermined period of time, and how a position growth score is calculated, according to some embodiments.

FIG. 9C is a diagram that depicts a group of proxy members joining a company and another group of proxy members leaving the company during the predetermined period of time, and how a position growth score is calculated, according to some embodiments. FIG. 9C focuses on proxy members who are joining company B (inbound) 930 compared to proxy members who are leaving company 13 (outbound) 936 during a predetermined period of time. These inbound transitions 912 and outbound transitions 924 show proxy members 930, 936 migrating from other employment positions 923 and to other employment positions 934 (e.g., any employment position other than company B, including unemployment). Based on these transitions, the system calculates a position growth score that reflects a growth population 915 or an attrition population 932 of proxy members at company B.

In the example shown in FIG. 9C, 5 proxy members are part of the growth population 915 and 5 proxy members are part of the attrition population 936. If all proxy members were valued equally, the system would determine that company B displays no growth and no attrition since the same number of employees have joined the company as have left the company within the last 30 days. However, additional factors beyond the number of proxy members may affect the position growth score, such as a skill set similarity between the searching member 160 and the proxy members, the number of proxy members relative to the size of the company, the job titles of proxy members within the company, how recently a proxy member has transitioned to or from the company, etc.

In some example embodiments, the similarity value between the searching member 160 and each proxy member is utilized to calculate the position growth score. In some example embodiments, the position growth score (PUS) for a company B associated with a member M1 over a period of time may be calculated according to the following equation:

$$PGS_{M1,B} = \alpha_1 \cdot S_{M1,P1} + \alpha_2 \cdot S_{M1,P2} + \alpha_3 \cdot S_{M1,P3} + \ldots + \alpha_n \cdot S_{M1,Pn}$$

Within the above formula, $PGS_{M1,B}$ represents the position growth score for the searching member M1 at the company B, $S_{M1,Pi}$ represents the similarity value between M1 and proxy member Pi, and $\alpha_i$ represents a dampening coefficient applied to each of the similarity values based on additional factors associated with the proxy member as described above, such as the number of proxy members relative to the size of the company, the job titles of proxy members within the company, and how recently the proxy member has transitioned to or from the company. In some embodiments, the proxy members leaving a company are given a negative dampening coefficient, causing a negative effect on the position growth score.

In the example of FIG. 9C, the 5 proxy members joining the company have a summed position growth score of 68.25 and the 5 proxy members leaving the company have a summed score of −22.25. These scores would yield a position growth score PSG for the searching member 160 of 46. This PSG score is used, in addition to other scores described in FIG. 7, to rank the company among other companies for presentation to the searching member 160, such as for selecting companies for the group, or ranking the group among other groups. Finally, the PSG score is displayed to the searching member 160 in the high-growth companies group area 408, as shown in FIG. 5A.

FIG. 9D is an additional illustration of a method for calculating a position growth score for each company by analyzing transitions of proxy members. A search for jobs is performed (at operation 938) for a member, such as the searching member 160. The search may be initiated by the member, such as by navigating to a "high-growth companies" page on a user interface, or may be initiated by the system to suggest jobs to the member. The system then accesses a plurality of jobs 940, such as from the job database 128, and companies 942, such as from the group database 130, to determine which of the companies 942 is offering each job 940. The system then calculates a similarity value between skills in a member profile of the searching member 946 and skills in member profiles 944 of other members on the social network. Based on these similarity values, the system determines which of members of the social network are proxy members 950, such as by determining whether the similarity value calculated for each member of the social network exceeds a similarity value. In some embodiments, the system further determines proxy members based on other factors, such as an education level of the searching member (e.g., what education degree) compared to the education level of each of the other members. For example, where the searching member 160 has a bachelor's degree in computer science, the system may determine that another member is a proxy member based on the first other member having a bachelor's degree in computer science, among other factors.

At operation 952, the system calculates a position growth score for each company based on transitions of proxy members within a predetermined period of time. A proxy member transition includes a proxy member joining a company or leaving a company within the predetermined time (such as the last 30 days). The position growth score can further be calculated pursuant a formula such as the equation shown in FIG. 9C.

At operations 954 and 956, the system ranks the companies 942, based on the position growth scores, and presents the companies to the searching member 106 within the high-growth companies group area 408 based on the ranking. For example, a first company with a position growth score that is higher than a second company will be ranked ahead of the second company. Then, at operation 956, when the system presents the companies within the company high-growth companies group area 408, the first company will be presented higher within the high-growth companies group area 408 than the second company, and thus will be viewable to the searching member 160 before the second company.

Figure 10:
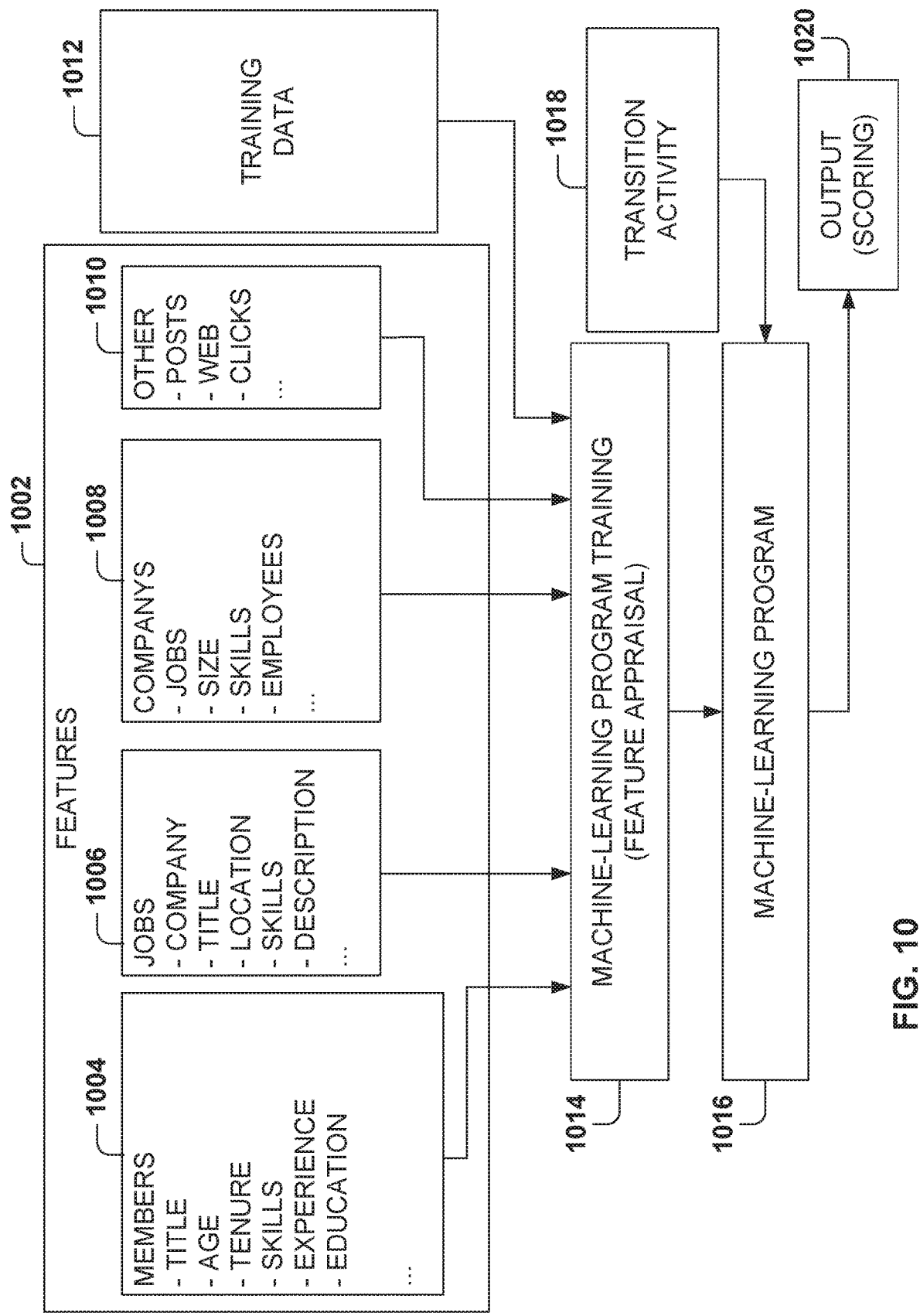
FIG. 10 illustrates the training and use of a machine-learning program, according to some example embodiments.

FIG. 10 illustrates the training and use of a machine-learning program 1016, according to some example embodiments. In some example embodiments, machine-learning programs, also referred to as machine-learning algorithms or tools, are utilized to perform operations associated with job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 1012 in order to make data-driven predictions or decisions expressed as outputs or assessments (e.g., a score) 1020. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

In general, there are two types of problems in machine learning: classification problems and regression problems. Classification algorithms aim at classifying items into one of several categories (for example, is this object an apple or an orange?). Regression algorithms aim at quantifying some items (for example, by providing a value that is a real number). In some embodiments, example machine-learning algorithms provide a job affinity score 606 (e.g., a number from 1 to 100) to qualify each job as a match for the member (e.g., calculating the job affinity score 606). In other example embodiments, machine learning is also utilized to calculate the group affinity score 710 and the job-to-group score 708. The machine-learning algorithms utilize the training data 1012 to find correlations among identified features 1002 that affect the outcome.

In one example embodiment, the features 1002 may be of different types and may include one or more of member features 1004, job features 1006, company features 1008, and other features 1010. The member features 1004 may include some or all of the data in the member profile 302, as described in FIG. 3, such as title, skills, experience, education, and so forth. The job features 1006 may include any data related to the job 202, and the company features 1008 may include various data related to the company, such as skills within a job profile of the company, skills desired for positions within the company, job titles for positions within the company, etc. In some example embodiments, additional data in the other features 1010 may be included, such as post data, message data, web data, click data, and so forth.

With the training data 1012 and the identified features 1002, the machine-learning tool is trained at operation 1014. The machine-learning tool appraises the value of the features 1002 as they correlate to the training data 1012. The result of the training is the trained machine-learning program 1016.

When the machine-learning program 1016 is used to generate a score, new data, such as transition activity 1018, is provided as an input to the trained machine-learning program 1016, and the machine-learning program 1016 generates the score 1020 as output. For example, when a member performs a job search, a machine-learning program, such as the machine-learning program 1016, trained with similarity data, such as from the company database 130 uses the member data from the member database 132 and job data from the jobs in the job database 128 to search for jobs that match the member's member profile 302 and activity.

As discussed above, the machine-learning program 1016 may be used, in some example embodiments, to determine a similarity value between the searching member 160 and a proxy member of the social network based on a comparison of skills within a first skill set associated with a member profile of the searching member 160 and skills associated with a member profile of the proxy member. In some example embodiments, the machine learning program 1016 can similarly be used to determine a similarity value between skills within member profiles and skills desired for the job.

In an example, the machine-learning program 1016 determines a high similarity value for the searching member 160 and a proxy member because they have both held jobs for several years that give them experience in coding in the Python programming language. Further, the machine-learning program 1016 determines high similarity values between the searching member 160 and jobs in a first company based on the first company offering jobs that involve Python coding, such that the searching member 160 would fill one or more positions within the company. As shown above, the similarity values can be used to determine a position growth for the company in relation to the searching member 160.

In some example embodiments, the machine-learning program 1016 accesses various data about transitions that members have made within a previous predetermined time period, such as leaving a first company, joining a second company, etc. (e.g., transition activity 1018). For example, when the machine-learning program 1016 aggregates member interactions in which the searching member 160 displays a high rate of growth in direct connections to company connections (e.g., the searching member 160 is making more connections to current or former employees), the machine-learning program 1016 may add a weighting factor to increase the social connection strength of company connections for the searching member 160. In some embodiments, the machine-learning program 1016 may further apply a weighting factor to the connection strengths of the social connections based on how recently (e.g., a number of days) the last activity, such as a browsing action, of the searching member 160 related to a company connection occurred. In some embodiments, the machine-learning program 1016 may further weight the company connections based on the searching member 160 having a high job affinity score 606 for jobs within the company.

Figure 11:
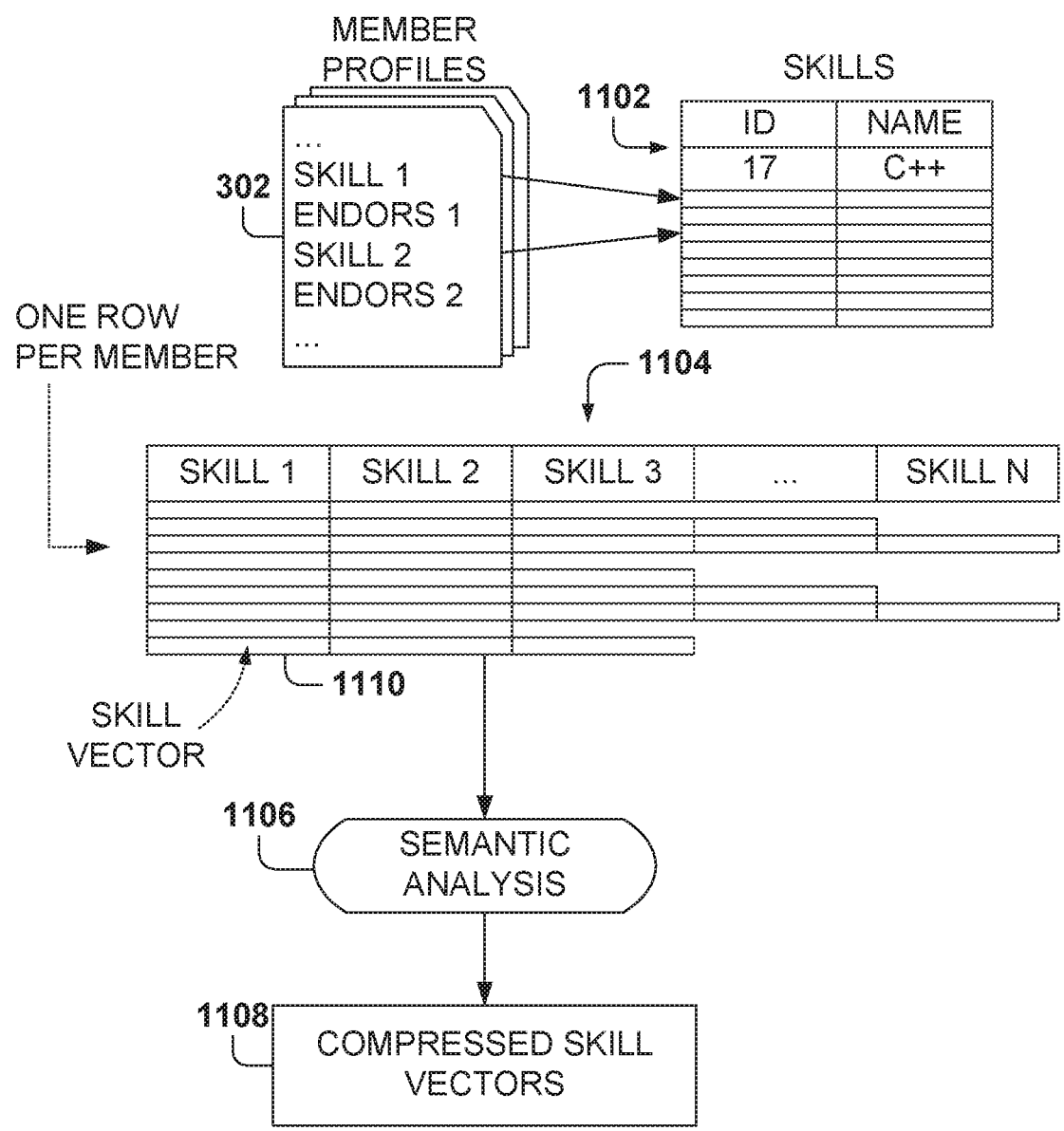
FIG. 11 illustrates a method for identifying similarities among member skills, according to some example embodiments.

FIG. 11 illustrates a method for identifying similarities among member skills, such as by the machine-learning program 1016, according to some example embodiments. In some example embodiments, the system compares skills from a member's skill set to skills of other members. In some example embodiments, the skills of the members of the social network are represented within a vector in a small dimensional space (e.g., with a dimension of 200).

Some example embodiments are presented for comparing member skills, but the same principles may be applied by comparing other features in addition to the skills, such as title, position, years of experience, etc., or any combination thereof. In some example embodiments, semantic vectors are created for the skills of members, and in other embodiments, the semantic vectors include the skills, the title, and the job function, for example.

Reducing vector dimension from a sparse vector representation to a compressed vector representation may be done in several ways. In one embodiment, the skills and title of each member are placed within a row, and then matrix factorization is utilized to reduce the vectors to a smaller dimension, such as 50 or 100. Then, in the reduced-dimension space, a nearest-neighbor computation from the member is performed, and can optionally be restricted to members who have engaged in member interactions with at least one job (good candidate proxy members). This way, proxy members with similar skills are found.

As used herein, the similarity coefficient between a first skill vector associated with the searching member and a second skill vector associated with a second member is a real number that quantifies a similarity between the skills of the searching member and the skills of the second member. The similarity coefficient is also referred to herein as the similarity value. In some example embodiments, the similarity coefficient is in the range 0 to 1, but other ranges are also possible. In some embodiments, cosine similarity is utilized to calculate the similarity coefficient between the skill vectors.

In some example embodiments, skill data 1102 includes a skill identifier (e.g., an integer value) and a skill description text (e.g., C++). The member profiles 302 are linked to the skill identifier, in some example embodiments.

Semantic analysis finds similarities among member skills by creating a vector for each member such that members with similar skills have skill vectors 1108 near each other. In one example embodiment, the tool Word2vec is used to perform the semantic analysis, but other tools may also be used, such as Gensim, Latent Dirichlet Allocation (LDA), or Tensor flow, These models are shallow, two-layer neural networks that are trained to reconstruct linguistic contexts of words. Word2vec takes as input a large corpus of text and produces a high-dimensional space (typically between a hundred and several hundred dimensions). Each unique word in the corpus is assigned a corresponding vector in the space. The vectors are positioned in the vector space such that words that share common contexts in the corpus are located in close proximity to one another in the space. In one example embodiment, each element of the skill vector 1108 is a real number.

Initially, a simple skill vector 1110 is created for each skill, where each simple skill vector 1110 includes a plurality of zeros and a 1 at the location corresponding to the skill. Afterwards, a concatenated skill table 1104 included in the member features 1004 is created, where each row includes a sequence with all the skills for a corresponding member. Thus, the first row of the concatenated skill table 1104 includes all the simple skill vectors 1110 for the skills of the searching member, the second row includes all the simple skill vectors 1110 for the skills of the second member, and so forth.

A semantic analysis operation 1106 is then performed on the concatenated skill table 1104. In one example embodiment, Word2vec is utilized, and the result is compressed skill vectors 1108, or simply "skill vectors," such that members with similar skills have skill vectors 1108 near each other (e.g., with a similarity coefficient below a predetermined threshold).

Figure 12:
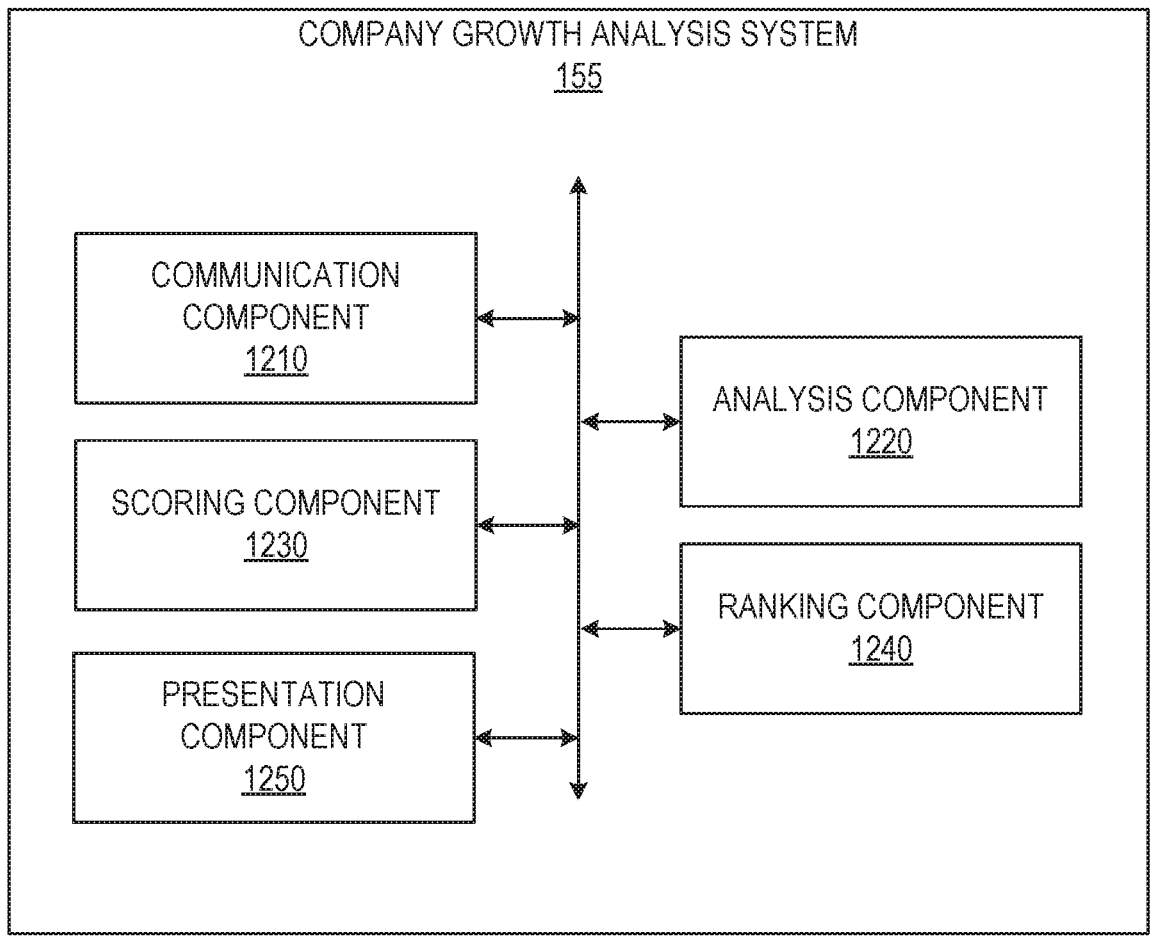
FIG. 12 illustrates a company growth analysis system for implementing example embodiments.

Using these models, the system can determine a similarity value between the searching member 160 and a proxy member on the social network. In an example, the similarity value between the searching member 160 and a first proxy member is determined by the machine-learning program 1016 to be 0.5678 on a scale of 0 to 1. This similarity value can be used, according to the position growth formula, to weight the proxy members who have transitioned to or from a company over the predetermined time period. Based on these weighted interactions and the weighted interactions from other proxy members, a position growth score for the first job can be determined FIG. 12 illustrates the company growth analysis system 155 for implementing example embodiments. In one example embodiment, the company growth analysis system 155 includes a communication component 1210, an analysis component 1220, a scoring component 1230, a ranking component 1240, and a presentation component 1250.

The communication component 1210 provides various data retrieval and communications functionality. In example embodiments, the communication component 1210 retrieves data from the databases 132, 128, 130, and 134, including member data, jobs data, group data, company features 1008, job features 1006, and member features 1004. The communication component 1210 can further retrieve data from the databases 132, 128, 130, and 134 related to rules such as an education background that is fulfillable by an education indicator (for example, an engineering bachelor's degree) within the searching member's profile. In some embodiments, the communication component 1210 additionally retrieves data relating to the predetermined period of time, such as whether the period is 20 days or 30 days, from the databases 132, 128, 130, and 134.

The analysis component 1220 performs operations such as determining proxy members based on similarity values between the searching member 160 and each member on the social network. This comparison may be performed using the machine-learning program 1016 described in FIG. 10. In some embodiments, the analysis component 1220 further determines whether the proxy members have transitioned to or from a company within a predetermined period of time.

The scoring component 1230 calculates various scores as illustrated above with reference to FIGS. 6-9C, The scoring component 1230 calculates the job affinity scores 606, job-to-group scores 708, group affinity scores 710, similarity values, and position growth scores as illustrated above with reference to FIGS. 6-9C. In some embodiments, the scoring component 1230 conducts a summation calculation, as described in FIG. 9C, to determine a position growth score for one or more companies that are offering jobs presentable to the searching member 160.

The ranking component 1240 provides functionality to rank the companies based on the position growth scores for the searching member 160, as determined by the scoring component 1230, within a high-growth companies group. In some example embodiments, the companies are ranked from highest to lowest position growth score.

The presentation component 1250 provides functionality to present a display of the high-growth companies group area 408 including the jobs with a display of the position growth scores to the searching member 160, such as on the user interface 402.

It is to be noted that the embodiments illustrated in FIG. 12 are examples and do not describe every possible embodiment. Other embodiments may utilize different servers or additional servers, combine the functionality of two or more servers into a single server, utilize a distributed server pool, and so forth. The embodiments illustrated in FIG. 12 should therefore not be interpreted to be exclusive or limiting, but rather illustrative.

Figure 13:
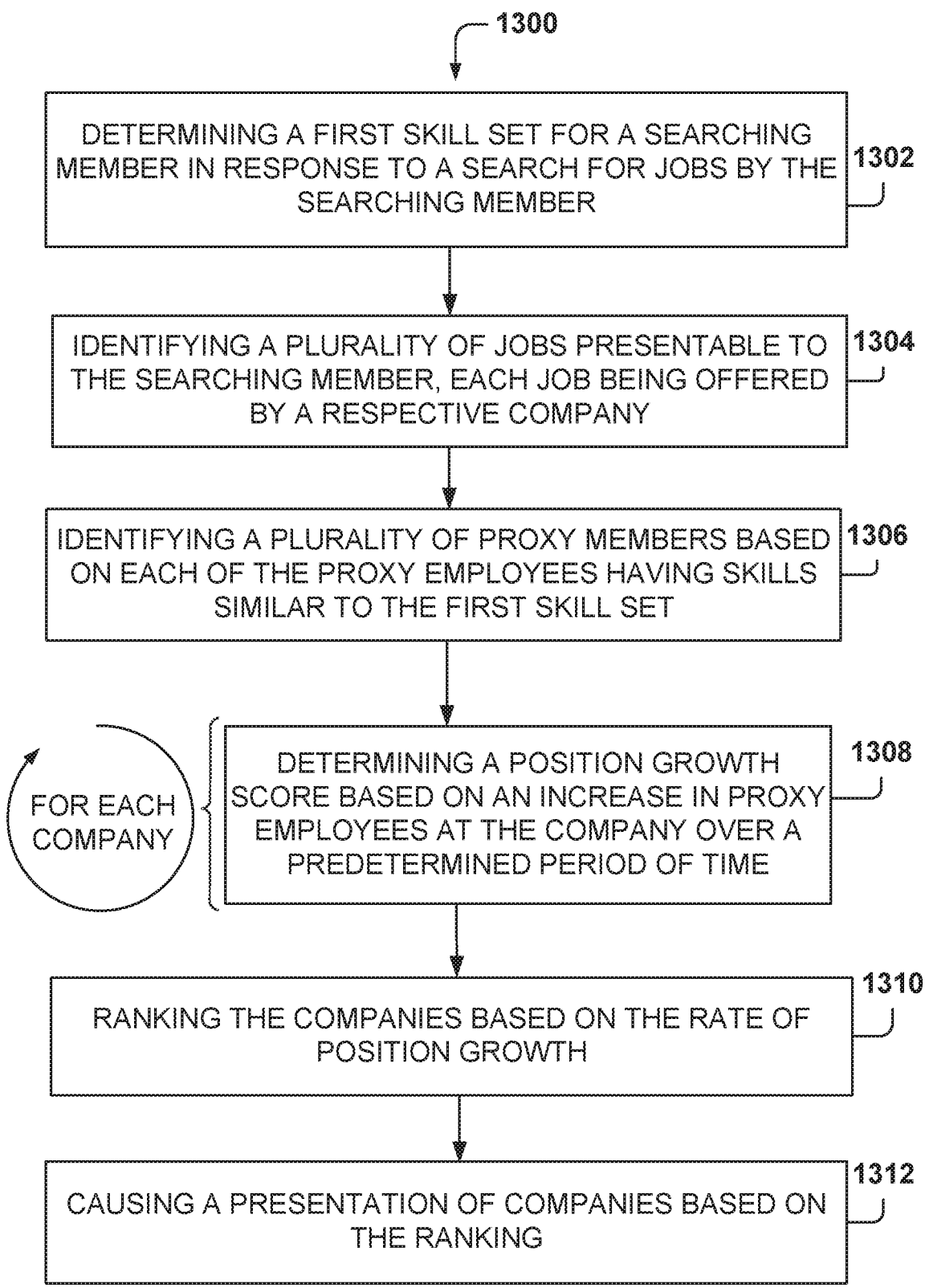
FIG. 13 is a flowchart of a method, according to some example embodiments, for presenting companies ranked by position growth rate in response to a search for a member.

FIG. 13 is a flowchart of a method 1300, according to some example embodiments, for presenting companies ranked by position growth rate in response to a search for a member. While the various operations in this flowchart are presented and described sequentially, one of ordinary skill will appreciate that some or all of the operations may be executed in a different order, be combined or omitted, or be executed in parallel.

Operation 1302 is for determining, by a server having one or more processors, a first skill set comprising skills located within the profile of the searching member 160 in response to a job search requested by the searching member 160. This can be accomplished via a machine-learning program 1016. From operation 1302, the method 1300 flows to operation 1304, where the server identifies a plurality of job listings (jobs) that are currently active and presentable to the searching member 160, each job being offered by a respective company. From operation 1304, the method 1300 flows to operation 1306, where the server identifies proxy members for each job based on a similarity of skills contained in the first skill set (from the searching member 160) and skills in the profile of each proxy member. This can be accomplished by ranking similarity values based on a comparison of skills contained in the first skill set and skills contained in the profile of each proxy member.

From operation 1306, the method 1300 flows to operation 1308, where the server calculates a position growth score for each company that is based on the number of proxy members that joined the companies over a predetermined period of time compared to the number of proxy members that left the companies over the predetermined period of time. In some embodiments, the calculation further accounts for the similarity values associated with each proxy member, such as by assigning higher position growth scores to companies that have employed proxy members with high similarity values and lower position growth scores to companies that have employed proxy members with low similarity values.

From operation 1308, the method 1300 then flows to operation 1310, where the companies are ranked by the server based on the position growth score of each company. Finally, from operation 1310, the method 1300 flows to operation 1312, where the system causes presentation of the companies within the high-growth companies group area 408 based on the ranking of the companies by position growth score.

Figure 14:
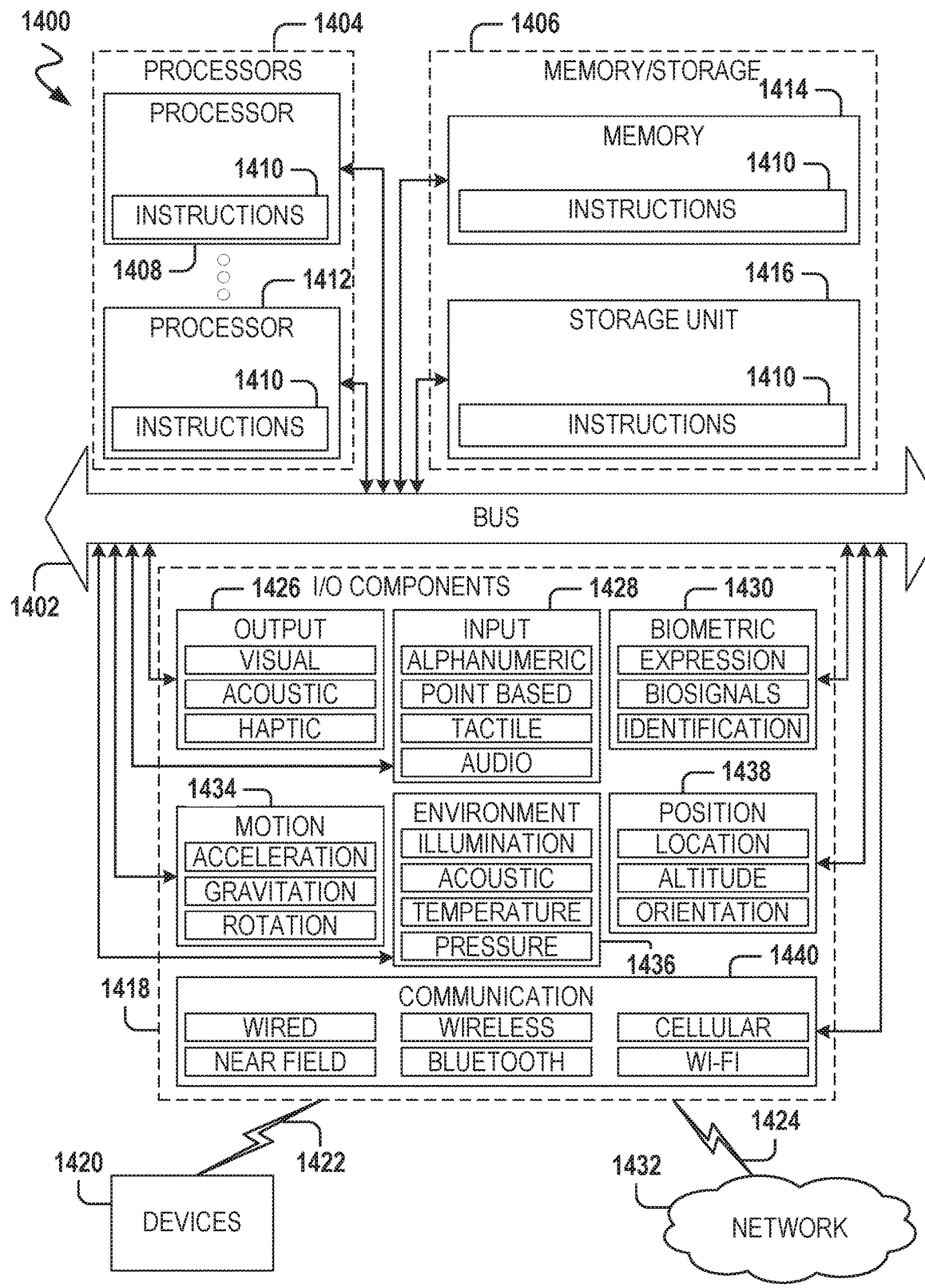
FIG. 14 is a block diagram illustrating an example of a software architecture that may be installed on a machine, according to some example embodiments.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. For example, the instructions 1410 may cause the machine 1400 to execute the flow diagram of FIG. 13. Additionally, or alternatively, the instructions 1410 may implement the job-scoring programs and the machine-learning programs associated with them. The instructions 1410 transform the general, non-programmed machine 1400 into a particular machine 1400 programmed to carry out the described and illustrated functions in the manner described.

In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines 1400 that individually or jointly execute the instructions 1410 to perform any one or more of the methodologies discussed herein.

The machine 1400 may include processors 1404, memory/storage 1406, and I/O components 1418, which may be configured to communicate with each other such as via a bus 1402. In an example embodiment, the processors 1404 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1408 and a processor 1412 that may execute the instructions 1410. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single core, a single processor with multiple cores (e.g., a multi-core processor), multiple processors with a single core, multiple processors with multiples cores, or any combination thereof.

The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof during execution thereof by the machine 1400. Accordingly, the memory 1414, the storage unit 1416, and the memory of the processors 1404 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store the instructions 1410. The term "machine-readable medium" shall also be taken to include any medium, or combination of multiple media, that is capable of storing instructions (e.g., instructions 1410) for execution by a machine (e.g., machine 1400), such that the instructions, when executed by one or more processors of the machine (e.g., processors 1404), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1418 may include a wide variety of components to receive input, provide output, produce output, transmit information, exchange information, capture measurements, and so on. The specific I/O components 1418 that are included in a particular machine will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion, and the grouping is in no way limiting. In various example embodiments, the components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1418 may include biometric components 1430, motion components 1434, environmental components 1436, or position components 1438 among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1434 may include acceleration sensor components (e.g., accelerometer), gravitation sensor components, rotation sensor components (e.g., gyroscope), and so forth. The environmental components 1436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1438 may include location sensor components (e.g., a Global Positioning System (GPS) receiver component altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via a coupling 1424 and a coupling 1422, respectively. For example, the communication components 1440 may include a network interface component or other suitable device to interface with the network 1432. In further examples, the communication components 1440 may include wired communication components, wireless communication components, cellular communication components, Near Field Communication (NEC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a Universal Serial Bus (USB)).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as location via Internet Protocol (IP) geo-location, location via Wi-Fi® signal triangulation, location via detecting an NEC beacon signal that may indicate a particular location, and so forth.

In various example embodiments, one or more portions of the network 1432 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1432 or a portion of the network 1432 may include a wireless or cellular network and the coupling 1424 may be a Code Division Multiple Access (CDMA) connection, a Global System for Mobile communications (GSM) connection, or another type of cellular or wireless coupling. In this example, the coupling 1424 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1410 may be transmitted or received over the network 1432 using a transmission medium via a network interface device (e.g., a network interface component included in the communication components 1440) and utilizing any one of a number of well-known transfer protocols (e.g., hypertext transfer protocol (HTTP)). Similarly, the instructions 1410 may be transmitted or received using a transmission medium via the coupling 1422 (e.g., a peer-to-peer coupling) to the devices 1420. The term "transmission medium" shall be taken to include any intangible medium that is capable of storing, encoding, or carrying the instructions 1410 for execution by the machine 1400, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Figure 15:
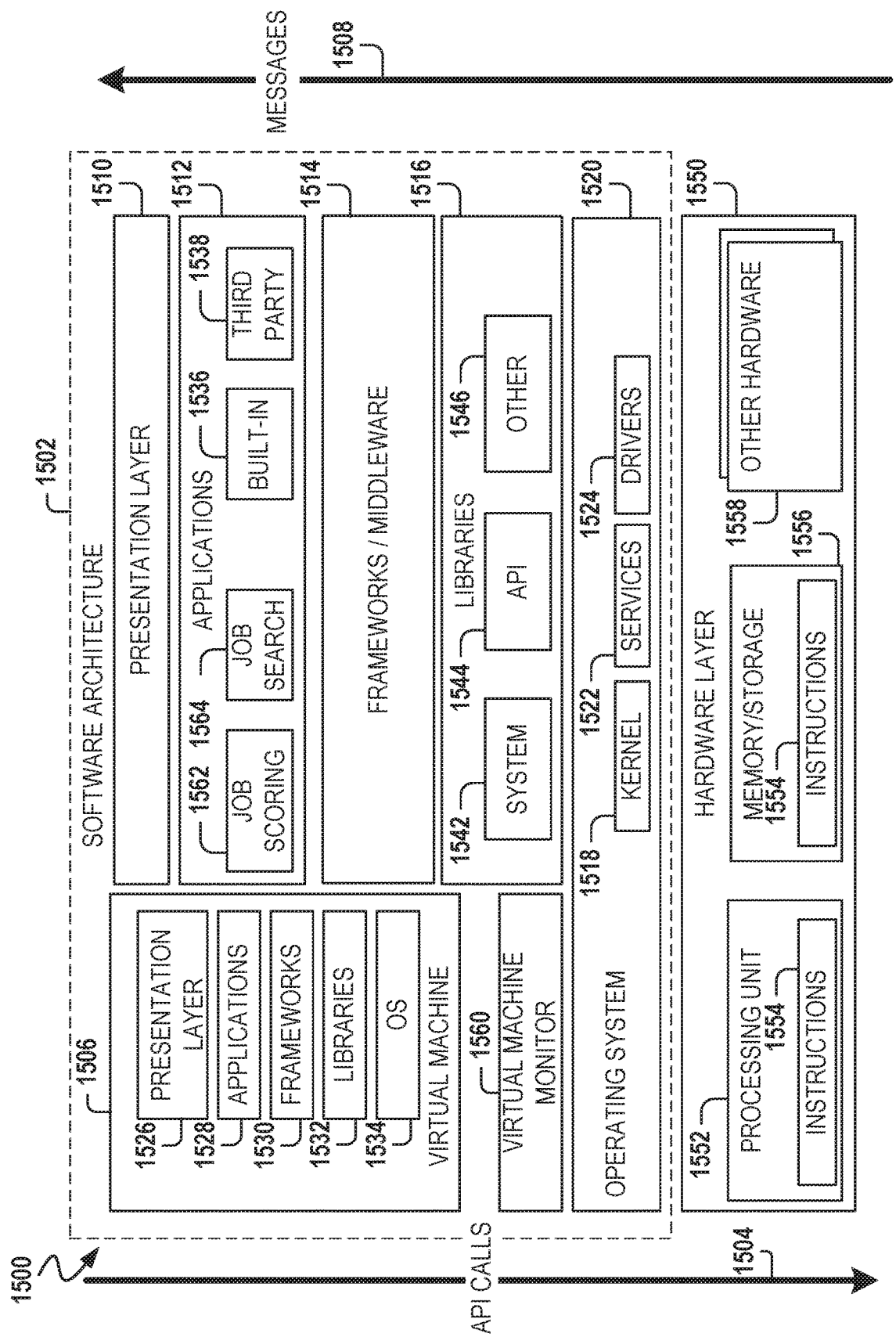
FIG. 15 is a diagrammatic representation of a machine in the form of a computer system within which a set of instructions may be executed for causing the machine to perform any one or more of the methodologies discussed herein, according to an example embodiment.

FIG. 15 is a block diagram 1500 illustrating a representative software architecture 1502, which may be used in conjunction with various hardware architectures herein described. FIG. 15 is merely a non-limiting example of a software architecture 1502, and it will be appreciated that many other architectures may be implemented to facilitate the functionality described herein. The software architecture 1502 may be executing on hardware such as the machine 1400 of FIG. 14 that includes, among other things, processors 1404, memory/storage 1406, and input/output (I/O) components 1418. A representative hardware layer 1550 is illustrated and can represent, for example, the machine 1400 of FIG. 14. The representative hardware layer 1550 comprises one or more processing units 1552 having associated executable instructions 1554. The executable instructions 1554 represent the executable instructions of the software architecture 1502, including implementation of the methods, modules, and so forth of the previous figures. The hardware layer 1550 also includes memory and/or storage modules 1556, which also have the executable instructions 1554. The hardware layer 1550 may also comprise other hardware 1558, which represents any other hardware of the hardware layer 1550, such as the other hardware illustrated as part of the machine 1400.

In the example architecture of FIG. 15, the software architecture 1502 may be conceptualized as a stack of layers where each layer provides particular functionality. For example, the software architecture 1502 may include layers such as an operating system 1520, libraries 1516, frameworks/middleware 1514, applications 1512, and a presentation layer 1510. Operationally, the applications 1512 and/or other components within the layers may invoke application programming interface (API) calls 1504 through the software stack and receive a response, returned values, and so forth, illustrated as messages 1508, in response to the API calls 1504. The layers illustrated are representative in nature, and not all software architectures have all layers. For example, some mobile or special-purpose operating systems may not provide a frameworks/middleware layer 1514, while others may provide such a layer. Other software architectures may include additional or different layers.

The operating system 1520 may manage hardware resources and provide common services. The operating system 1520 may include, for example, a kernel 1518, services 1522, and drivers 1524. The kernel 1518 may act as an abstraction layer between the hardware and the other software layers. For example, the kernel 1518 may be responsible for memory management, processor management (e.g., scheduling), component management, networking, security settings, and so on. The services 1522 may provide other common services for the other software layers. The drivers 1524 may be responsible for controlling or interfacing with the underlying hardware. For instance, the drivers 1524 may include display drivers, camera drivers, Bluetooth® drivers, flash memory drivers, serial communication drivers (e.g., USB drivers), Wi-Fi® drivers, audio drivers, power management drivers, and so forth depending on the hardware configuration.

The libraries 1516 may provide a common infrastructure that may be utilized by the applications 1512 and/or other components and/or layers. The libraries 1516 typically provide functionality that allows other software modules to perform tasks in an easier fashion than by interfacing directly with the underlying operating system 1520 functionality (e.g., kernel 1518, services 1522, and/or drivers 1524). The libraries 1516 may include system libraries 1542 (e.g., C standard library) that may provide functions such as memory allocation functions, string manipulation functions, mathematic functions, and the like. In addition, the libraries 1516 may include API libraries 1544 such as media libraries (e.g., libraries to support presentation and manipulation of various media formats such as MPEG4, H.264, MP3, AAC, AMR, JPG, PNG), graphics libraries (e.g., an OpenGL framework that may be used to render two-dimensional and three-dimensional graphic content on a display), database libraries (e.g., SQLite that may provide various relational database functions), web libraries (e.g., WebKit that may provide web browsing functionality), and the like. The libraries 1516 may also include a wide variety of other libraries 1546 to provide many other APIs to the applications 1512 and other software components/modules, The frameworks 1514 (also sometimes referred to as middleware) may provide a higher-level common infrastructure that may be utilized by the applications 1512 and/or other software components/modules. For example, the frameworks 1514 may provide various graphic user interface (GUI) functions, high-level resource management, high-level location services, and so forth. The frameworks 1514 may provide a broad spectrum of other APIs that may be utilized by the applications 1512 and/or other software components/modules, some of which may be specific to a particular operating system or platform.

The applications 1512 include job-scoring applications 1562, job search/suggestions 1564, built-in applications 1536, and third-party applications 1538. The job-scoring applications 1562 comprise the job-scoring applications, as discussed above with reference to FIG. 11. Examples of representative built-in applications 1536 may include, but are not limited to, a contacts application, a browser application, a book reader application, a location application, a media application, a messaging application, and/or a game application. The third-party applications 1538 may include any of the built-in applications 1536 as well as a broad assortment of other applications. In a specific example, the third-party application 1538 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1538 may invoke the API calls 1504 provided by the mobile operating system such as the operating system 1520 to facilitate functionality described herein.

The applications 1512 may utilize built-in operating system functions (e.g., kernel 1518, services 1522, and/or drivers 1524), libraries (e.g., system libraries 1542, API libraries 1544, and other libraries 1546), or frameworks/middleware 1514 to create user interfaces to interact with users of the system. Alternatively, or additionally, in some systems, interactions with a user may occur through a presentation layer, such as the presentation layer 1510. In these systems, the application/module "logic" can be separated from the aspects of the application/module that interact with a user.

Some software architectures utilize virtual machines. In the example of FIG. 15, this is illustrated by a virtual machine 1506. A virtual machine creates a software environment where applications/modules can execute as if they were executing on a hardware machine (such as the machine 1400 of FIG. 14, for example). The virtual machine 1506 is hosted by a host operating system (e.g., operating system 1520 in FIG. 15) and typically, although not always, has a virtual machine monitor 1560, which manages the operation of the virtual machine 1506 as well as the interface with the host operating system (e.g., operating system 1520). A software architecture executes within the virtual machine 1506, such as an operating system 1534, libraries 1532, frameworks/middleware 1530, applications 1528, and/or a presentation layer 1526. These layers of software architecture executing within the virtual machine 1506 can be the same as corresponding layers previously described or may be different.

What is claimed is:

1. A computer-implemented method for presenting in a single user interface, to a first member of a social networking service, a plurality of groups of online job postings, wherein one group of online job postings in the plurality of groups of online job postings includes a plurality of online job postings, each online job posting in the plurality of online job postings describing a position at a company that has exhibited a high level of growth in hiring employees having skills similar to skills possessed by the first member, the method comprising:

responsive to receiving a job search query for a first member of the social networking service:
processing, by one or more processors, a member profile of the first member to determine a skill set of the first member, the skill set including skills indicated in the member profile of the first member;
processing, by the one or more processors, the job search query to identify a plurality of online job postings satisfying criteria specified in the job search query, each online job posting specifying a company at which a job is available; and
for each company associated with an online job posting satisfying criteria specified in the job search query, i) processing member profiles of the social networking service to derive a similarity score for each member of the social networking service having a member profile indicating the member has some number of skills in common with skills in the skill set of the first member and has been hired by the respective company within some predetermined preceding period of time, and ii) processing member profiles of the social networking service to derive a similarity score for each member of the social networking service having a member profile indicating the member has some number of skills in common with skills in the first skill set of the first member and has left an employment position with the respective company within some predetermined preceding period of time, and iii) deriving for the respective company a position growth score by, in part, aggregating the derived similarity values that exceed some predetermined threshold for members who have been hired by the respective company within some predetermined preceding period of time, and subtracting from the result those similarity values that exceed some predetermined threshold for members who have left an employment position with the respective company; and presenting in the single user interface a plurality of groups of online job postings, each group of online job postings in the plurality of groups of online job postings including a plurality of online job postings, the plurality of groups of online job postings including one group of online job postings that includes a plurality of online job postings associated with companies having a position growth score that exceeds some predetermined threshold.

2. The computer-implemented method of claim 1, wherein deriving for the respective company a position growth score by, in part, aggregating the derived similarity values that exceed some predetermined threshold for members who have been hired by the respective company within some predetermined preceding period of time, and subtracting from the result those similarity values that exceed some predetermined threshold for members who have left an employment position with the respective company includes:
prior to aggregating or subtracting similarity values, multiplying each similarity value by a dampening coefficient that is selected to increase or decrease a similarity value based on various factors associated with the member for whom the similarity value has been derived, wherein at least one factor is the number of members for whom a derived similarity value exceeds some predetermined threshold relative to the total number of members employed with the respective company.

3. The computer-implemented method of claim 1, wherein deriving for the respective company a position growth score by, in part, aggregating the derived similarity values that exceed some predetermined threshold for members who have been hired by the respective company within some predetermined preceding period of time, and subtracting from the result those similarity values that exceed some predetermined threshold for members who have left an employment position with the respective company includes:
prior to aggregating or subtracting similarity values, multiplying each similarity value by a dampening coefficient that is selected to increase or decrease a similarity value based on various factors associated with the member for whom the similarity value has been derived, wherein at least one factor is the number of online job postings for the company.

4. The computer-implemented method of claim 1, further comprising:
for at least one online job posting associated with a company having a position growth score that exceeds some predetermined threshold, presenting in the single user interface with the at least one online job posting a first number and a second number, the first number indicating the number of members with similarity values exceeding the predetermined threshold who have been hired by the respective company within some predetermined preceding period of time, the second number indicating the number of days that have lapsed since the first number of members were hired.

5. The computer-implemented method of claim 1, further comprising:
for at least one online job posting associated with a company having a position growth score that exceeds some predetermined threshold, presenting in the single user interface with the at least one online job posting a number indicating the position growth score for the company associated with the at least one online job posting.

6. The computer-implemented method of claim 1, wherein the job search query for the first member is received as a result of the first member interacting with a job search interface to invoke a job search associated with the job search query.

7. The computer-implemented method of claim 1, wherein the job search query for the first member is received as a result of a job recommendation engine invoking a job search for the member, to identify online job postings to recommend to the first member.

8. A system comprising:
at least one processor;
a memory storage device storing instructions, which, when executed by the at least one processor, causes the system to perform operations comprising:
responsive to receiving a job search query for a first member of the social networking service:
processing by one or more processors a member profile of the first member to determine a skill set of the first member, the skill set including skills indicated in the member profile of the first member;
processing, by the one or more processors, the job search query to identify a plurality of online job postings satisfying criteria specified in the job search query, each online job posting specifying a company at which a job is available; and
for each company associated with an online job posting satisfying criteria specified in the job search query, i) processing member profiles of the social networking service to derive a similarity score for each member of the social networking service having a member profile indicating the member has some number of skills in common with skills in the skill set of the first member and has been hired by the respective company within some predetermined preceding period of time, and ii) processing member profiles of the social networking service to derive a similarity score for each member of the social networking service having a member profile indicating the member has some number of skills in common with skills in the first skill set of the first member and has left an employment position with the respective company within some predetermined preceding period of time, and iii) deriving for the respective company a position growth score by, in part, aggregating the derived similarity values that exceed some predetermined threshold for members who have been hired by the respective company within some predetermined preceding period of time, and subtracting from the result those similarity values that exceed some predetermined threshold for members who have left an employment position with the respective company; and
presenting in the single user interface a plurality of groups of online job postings, each group of online job postings in the plurality of groups of online job postings including a plurality of online job postings, the plurality of groups of online job postings including one group of online job postings that include a plurality of online job postings associated with companies having a position growth score that exceeds some predetermined threshold.

9. The system of claim 8, wherein the memory storage device is storing additional instructions, which, when executed by the at least one processor, causes the system to perform operations comprising:
prior to aggregating or subtracting similarity values, multiplying each similarity value by a dampening coefficient that is selected to increase or decrease a similarity value based on various factors associated with the member for whom the similarity value has been derived, wherein at least one factor is the number of members for whom a derived similarity value exceeds some predetermined threshold, relative to the total number of members employed with the respective company.

10. The system of claim 8, wherein the memory storage device is storing additional instructions, which, when executed by the at least one processor, causes the system to perform operations comprising:
prior to aggregating or subtracting similarity values, multiplying each similarity value by a dampening coefficient that is selected to increase or decrease a similarity value based on various factors associated with the member for whom the similarity value has been derived, wherein at least one factor is the number of online job postings for the company.

11. The system of claim 8, wherein the memory storage device is storing additional instructions, which, when executed by the at least one processor, causes the system to perform operations comprising:
for at least one online job posting associated with a company having a position growth score that exceeds some predetermined threshold, presenting in the single user interface with the at least one online job posting a first number and a second number, the first number indicating the number of members with similarity values exceeding the predetermined threshold who have been hired by the respective company within some predetermined preceding period of time, the second number indicating the number of days that have lapse since the first number of members were hired.

12. The system of claim 8, wherein the memory storage device is storing additional instructions, which, when executed by the at least one processor, causes the system to perform operations comprising:
for at least one online job posting associated with a company having a position growth score that exceeds some predetermined threshold, presenting in the single user interface with the at least one online job posting a number indicating the position growth score for the company associated with the at least one online job posting.

13. The system of claim 8, wherein the memory storage device is storing additional instructions, which, when executed by the at least one processor, causes the system to perform operations comprising:
receiving the job search query for the first member of the social networking service as a result of the first member interacting with a job search interface to invoke a job search associated with the job search query.

14. The system of claim 8, wherein the memory storage device is storing additional instructions. which, when executed by the at least one processor, causes the system to perform operations comprising:
receiving the job search query for the first member of the social networking service as a result of a job recommendation engine invoking a job search for the member, to identify online job postings to recommend to the first member.

* * * * *

UNITED STATES PATENT AND TRADEMARK OFFICE
CERTIFICATE OF CORRECTION

PATENT NO. : 10,607,189 B2
APPLICATION NO. : 15/478821
DATED : March 31, 2020
INVENTOR(S) : Kenthapadi et al.

Page 1 of 1

It is certified that error appears in the above-identified patent and that said Letters Patent is hereby corrected as shown below:

In the Claims

In Column 26, Line 30, in Claim 2, delete "threshold" and insert --threshold,-- therefor In Column 27, Line 21, in Claim 8, delete "processing" and insert --processing,-- therefor In Column 27, Line 21, in Claim 8, delete "processors" and insert --processors,-- therefor Signed and Sealed this
Seventh Day of July, 2020

Andrei Iancu
*Director of the United States Patent and Trademark Office*